United States Patent
Won et al.

(10) Patent No.: US 11,262,614 B2
(45) Date of Patent: Mar. 1, 2022

(54) BEAM DEFLECTOR AND THREE-DIMENSIONAL DISPLAY DEVICE INCLUDING THE SAME

(71) Applicant: SAMSUNG ELECTRONICS CO., LTD., Suwon-si (KR)

(72) Inventors: Kanghee Won, Seoul (KR); Young Kim, Yongin-si (KR); Hoon Song, Yongin-si (KR); Sunil Kim, Seoul (KR); Jungkwuen An, Suwon-si (KR); Sunghoon Lee, Seoul (KR); Hongseok Lee, Seoul (KR); Chilsung Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/883,596

(22) Filed: May 26, 2020

(65) Prior Publication Data
US 2020/0285110 A1 Sep. 10, 2020

Related U.S. Application Data

(63) Continuation of application No. 16/103,406, filed on Aug. 14, 2018, now Pat. No. 10,690,958.

(30) Foreign Application Priority Data

Oct. 18, 2017 (KR) .......... 10-2017-0135242
Oct. 31, 2017 (KR) .......... 10-2017-0144220

(51) Int. Cl.
*G02F 1/1335* (2006.01)
*G02F 1/13363* (2006.01)
(Continued)

(52) U.S. Cl.
CPC ..... *G02F 1/133528* (2013.01); *G02B 5/3033* (2013.01); *G02B 30/25* (2020.01);
(Continued)

(58) Field of Classification Search
CPC ............... G02F 1/133632; G02F 27/26; G02F 1/133528; G02F 1/133634; G02F 1/29;
(Continued)

(56) References Cited

U.S. PATENT DOCUMENTS 3,836,230 A    9/1974   Adams
5,638,203 A *   6/1997   Hasegawa ............... G02F 1/29
                                               349/139
(Continued)

FOREIGN PATENT DOCUMENTS

EP    1 761 074 A1   3/2007
JP    2015-31790 A   2/2015
(Continued)

OTHER PUBLICATIONS

Communication dated Mar. 18, 2019 issued by the European Intellectual Property Office in counterpart European Application No. 18200770.8.

*Primary Examiner* — Hoan C Nguyen
(74) *Attorney, Agent, or Firm* — Sughrue Mion, PLLC

(57) ABSTRACT

A beam deflector includes a first wavelength selective polarizer configured to convert a polarization state of light in a first wavelength band into a first polarization state, a first liquid crystal deflector including liquid crystal molecules and an optical path change surface to deflect light incident from the first wavelength selective polarizer, and a controller configured to control the first liquid crystal deflector to adjust an angle of the first optical path change surface.

19 Claims, 15 Drawing Sheets

(51) Int. Cl.
*G02B 5/30* (2006.01)
*G03H 1/22* (2006.01)
*G02F 1/29* (2006.01)
*G02B 30/25* (2020.01)
*G02B 30/56* (2020.01)

(52) U.S. Cl.
CPC ....... *G02B 30/56* (2020.01); *G02F 1/133632* (2013.01); *G02F 1/133634* (2013.01); *G02F 1/29* (2013.01); *G03H 1/2286* (2013.01); *G03H 1/2294* (2013.01); *G02F 1/133531* (2021.01); *G02F 1/133533* (2013.01); *G02F 1/133538* (2021.01); *G03H 2001/2242* (2013.01); *G03H 2222/54* (2013.01); *G03H 2223/16* (2013.01); *G03H 2226/05* (2013.01)

(58) Field of Classification Search
CPC ... G02F 1/133533; G02F 2001/133538; G02F 2001/133531; G02B 5/3033; G02B 27/2292; G02B 27/26; G02B 30/56; G02B 30/25; G03H 1/2286; G03H 1/2294; G03H 2001/2242; G03H 2222/54; G03H 2223/16; G03H 2226/05
See application file for complete search history.

(56) References Cited

U.S. PATENT DOCUMENTS

| | | | |
|---|---|---|---|
| 5,664,032 A | 9/1997 | Bischel et al. | |
| 6,169,594 B1 | 1/2001 | Aye | |
| 6,636,276 B1 | 10/2003 | Rosenbluth | |
| 9,778,511 B2 | 10/2017 | Iwasaki | |
| 9,798,182 B2 | 10/2017 | Im et al. | |
| 2001/0033400 A1 | 10/2001 | Sutherland et al. | |
| 2002/0003601 A1 | 1/2002 | Wang | |
| 2003/0098945 A1* | 5/2003 | Sugimoto | G02F 1/31 349/172 |
| 2010/0134511 A1* | 6/2010 | Steinert | G02B 21/367 345/589 |
| 2013/0077024 A1 | 3/2013 | Shikii et al. | |
| 2013/0155337 A1* | 6/2013 | Sugiyama | H04N 13/32 349/15 |
| 2014/0016098 A1 | 1/2014 | Matsumoto | |
| 2015/0234197 A1 | 8/2015 | Ushigome | |
| 2016/0252755 A1 | 9/2016 | Lavrentovich | |
| 2016/0349573 A1* | 12/2016 | Ohmuro | G02B 5/305 |
| 2017/0200423 A1* | 7/2017 | Kim | G09G 3/2003 |
| 2017/0329160 A1 | 11/2017 | Konuma | |
| 2018/0129105 A1 | 5/2018 | Kim et al. | |
| 2018/0292742 A1* | 10/2018 | Miura | G02B 27/283 |
| 2020/0174263 A1* | 6/2020 | Greenberg | G02B 27/106 |

FOREIGN PATENT DOCUMENTS

| | | |
|---|---|---|
| JP | 2016-218459 A | 12/2016 |
| KR | 10-2016-0029195 A | 3/2016 |
| KR | 10-2016-0070714 A | 6/2016 |
| KR | 10-2017-0084951 A | 7/2017 |

* cited by examiner

BEAM DEFLECTOR AND THREE-DIMENSIONAL DISPLAY DEVICE INCLUDING THE SAME

CROSS-REFERENCE TO RELATED APPLICATIONS

This application is a continuation application of U.S. application Ser. No. 16/103,406, filed Aug. 14, 2018, which claims the priority from Korean Patent Application No. 10-2017-0135242 filed on Oct. 18, 2017, and Korean Patent Application No. 10-2017-0144220 filed on Oct. 31, 2017, in the Korean Intellectual Property Office, the disclosures of which are incorporated herein in their entireties by reference.

BACKGROUND

1. Field

Example embodiments of the present disclosure relate to a beam deflector and a three-dimensional display device including the beam deflector.

2. Description of the Related Art

Beam deflectors for changing the propagation direction of light may be used in three-dimensional displays to provide directivity. A scattering phenomenon occurring because light is deflected by a beam deflector in slightly different directions according to the color light may be prevented by a method of dividing the operation of a beam deflector according to the color of light. Examples of the dividing method include a spatial-multiplexing method and a time-multiplexing method.

In the case of the spatial-multiplexing method, beams are deflected by separate beam splitters in separate spaces according to the colors of the beams, and thus, a system using the spatial-multiplexing method may be more bulky. In the case of the time-multiplexing method, time is divided according to the color of light to more finely adjust the deflection direction of a beam deflector according to the color of light. However, use of the time-multiplexing method is inconvenient because a beam deflector having responsiveness faster than a beam deflector used in the spatial multiplexing method by a factor of 3 is required.

SUMMARY

One or more example embodiments provide a beam deflector and a three-dimensional display device including the beam deflector.

According to an aspect of an example embodiment, there is provided a beam deflector including a first wavelength selective polarizer configured to selectively convert a polarization state of light in a first wavelength band into a first polarization state, a first liquid crystal deflector configured to selectively deflect light incident from the first wavelength selective polarizer, the first liquid crystal deflector including liquid crystal molecules and a first optical path change surface, and a controller configured to control the first liquid crystal deflector to adjust the first optical path change surface.

The major axes of the liquid crystal molecules may be arranged parallel to a direction of the first polarization state when a voltage is not applied to the first liquid crystal deflector by the controller.

The beam deflector may further include a polarizer having a polarization axis parallel to a direction of a second polarization state, the polarizer being configured to transmit light having the second polarization state perpendicular to the first polarization state to be incident on the first wavelength selective polarizer.

The first liquid crystal deflector may further include a first electrode part and a second electrode part spaced apart from each other with the liquid crystal molecules therebetween, and an angle of inclination of the first optical path change surface may be adjusted based on a voltage applied by the controller between the first electrode part and the second electrode part.

The first electrode part may include sub-electrodes configured such that voltages applied to the sub-electrodes are individually controlled by the controller.

The beam deflector may further include a first-second liquid crystal deflector provided above the first liquid crystal deflector opposite to the a first wavelength selective polarizer, the first-second liquid crystal deflector including liquid crystal molecules and a first-second optical path change surface, wherein an angle of inclination of the first-second optical path change surface may be adjusted with respect to a second axis which is different from a first axis of the first optical path change surface.

The controller may be further configured to control a shape of the first optical path change surface such that the first optical path change surface includes two surfaces inclined at different angles to deflect light incident on the first liquid crystal deflector in two directions, respectively.

The beam deflector may further include a second wavelength selective polarizer provided along an optical path of light passing through the first liquid crystal deflector and configured to convert a polarization state of light in a second wavelength band into the first polarization state, and a second liquid crystal deflector configured to deflect light incident from the second wavelength selective polarizer, the second liquid crystal deflector including liquid crystal molecules and a second optical path change surface.

The beam deflector may further include a third wavelength selective polarizer provided along an optical path of light passing through the second liquid crystal deflector and configured to convert a polarization state of light in a third wavelength band into the first polarization state, and a third liquid crystal deflector configured to deflect light incident from the third wavelength selective polarizer, the third liquid crystal deflector including liquid crystal molecules and a third optical path change surface.

The beam deflector may further include a polarizer having a polarization axis parallel to a direction of a second polarization state and configured to transmit light having the second polarization state perpendicular to the first polarization state on the first wavelength selective polarizer.

The controller may be configured to control the first liquid crystal deflector, the second liquid crystal deflector, and the third liquid crystal deflector such that the first optical path change surface, the second optical path change surface, and the third optical path change surface are adjusted to be inclined at different angles to deflect light in the first wavelength band and the first polarization state, light in the second wavelength band and the first polarization state, and light in the third wavelength band and the first polarization state in a first direction, respectively.

The beam deflector may further include an optical path change member configured to deflect the light deflected in the first direction by the first liquid crystal deflector, the second liquid crystal deflector, and the third liquid crystal deflector in a second direction different from the first direction.

The controller may be further configured to control a shape of the first optical path change surface such that the first optical path change surface includes two surfaces inclined at different angles to deflect light incident on the first liquid crystal deflector in two directions, respectively, the controller is further configured to control a shape of the second optical path change surface such that the second optical path change surface has two surfaces inclined at different angles to deflect light incident on the second liquid crystal deflector in the two directions, respectively, and the controller is further configured to control a shape of the third optical path change surface such that the third optical path change surface has two surfaces inclined at different angles to deflect light incident on the third liquid crystal deflector in the two directions, respectively.

The beam deflector may further include an optical path change member configured to deflect the light deflected in the two directions by the first liquid crystal deflector, the second liquid crystal deflector, and the third liquid crystal deflector in directions different from the two directions.

According to an aspect of another example embodiment, there is provided a three dimensional display device including a light source configured to emit light beam including a plurality of wavelength bands, a beam deflector configured to deflect the light beam from the light source, the beam deflector including a first wavelength selective polarizer configured to convert a polarization state of light in a first wavelength band into a first polarization state, a first liquid crystal deflector configured to deflect light incident from the first wavelength selective polarizer, the first liquid crystal deflector including liquid crystal molecules and a first optical path change surface, a second wavelength selective polarizer provided along an optical path of light passing through the first liquid crystal deflector and configured to convert a polarization state of light in a second wavelength band into the first polarization state, a second liquid crystal deflector configured to deflect light incident from the second wavelength selective polarizer, the second liquid crystal deflector including liquid crystal molecules and a second optical path change surface, a third wavelength selective polarizer provided along an optical path of light passing through the second liquid crystal deflector and configured to convert a polarization state of light in a third wavelength band into the first polarization state, and a third liquid crystal deflector configured to deflect light incident from the third wavelength selective polarizer, the third liquid crystal deflector including liquid crystal molecules and a third optical path change surface, a controller configured to control a direction in which light is deflected by the beam deflector, and a spatial optical modulator configured to form a hologram image by diffracting light incident from the beam deflector.

The major axes of the liquid crystal molecules included in the first liquid crystal deflector, the second liquid crystal deflector, and the third liquid crystal deflectors may be arranged parallel to a direction of the first polarization state when a voltage is not applied to the first liquid crystal deflector, the second liquid crystal deflector, and the third liquid crystal deflectors by the controller.

The three-dimensional display device may further include a polarizer provided between the light source and the beam deflector, the polarizer having a polarization axis in a direction parallel to a second polarization state which is perpendicular to the first polarization state.

The beam deflector further include a first-second liquid crystal deflector provided above the first liquid crystal deflector, the first-second liquid crystal deflector including liquid crystal molecules and a first-second optical path change surface, wherein an angle of inclination of the first-second optical path change surface is adjusted with respect to a first-second axis which is different from a first axis of the first optical path change surface, a second-second liquid crystal deflector provided above the second liquid crystal deflector, the second-second liquid crystal deflector including liquid crystal molecules and a second-second optical path change surface, wherein an angle of inclination of the second-second optical path change surface is adjusted with respect to a second-second axis which is different from a second axis of the second optical path change surface, and a third-second liquid crystal deflector provided above the third liquid crystal deflector, the third-second liquid crystal deflector including liquid crystal molecules and a third-second optical path change surface, wherein an angle of inclination of the third-second optical path change surface is adjusted with respect to a third-second axis which is different from a third axis of the third optical path change surface.

The controller may be further configured to control a shape of the first optical path change surface such that the first optical path change surface includes two surfaces inclined at different angles to deflect light incident on the first liquid crystal deflector in two directions, respectively, the controller may be further configured to control a shape of the second optical path change surface such that the second optical path change surface has two surfaces inclined at different angles to deflect light incident on the second liquid crystal deflector in the two directions, respectively, and the controller may be further configured to control a shape of the third optical path change surface such that the third optical path change surface has two surfaces inclined at different angles to deflect light incident on the third liquid crystal deflector in the two directions, respectively.

The controller may be further configured to control the beam deflector such that the direction in which light is deflected by the beam deflector is adjusted, by a time-sequence method, between a direction toward a left eye of a user and a direction toward a right eye of the user.

According to an aspect of another example embodiment, there is provided a beam deflector including a first wavelength selective polarizer configured to convert a polarization state of a first wavelength band light into a first polarization state, and maintain a polarization state of a second wavelength band light and a polarization state of a third wavelength band light, a first liquid crystal deflector configured to deflect the first wavelength band light incident from the first wavelength selective polarizer, and output the second wavelength band light and the third wavelength band light incident from the first wavelength selective polarizer without deflection, the first liquid crystal deflector including liquid crystal molecules and a first optical path change surface, and a controller configured to control the first liquid crystal deflector to adjust an angle of the first optical path change surface.

The beam deflector may further include a second wavelength selective polarizer provided along an optical path of light passing through the first liquid crystal deflector, and configured to convert the polarization state of the second wavelength band light into the first polarization state, and maintain the polarization state of the first wavelength band light and the polarization state of the third wavelength band light, and a second liquid crystal deflector configured to deflect the second wavelength band light incident from the second wavelength selective polarizer and output the first wavelength band light and the third wavelength band light incident from the second wavelength selective polarizer without deflection, the second liquid crystal deflector including liquid crystal molecules and a second optical path change surface.

The beam deflector may further include a third wavelength selective polarizer provided along an optical path of light passing through the second liquid crystal deflector, and configured to convert the polarization state of the third wavelength band light into the first polarization state, and maintain the polarization state of the first wavelength band light and the polarization state of the second wavelength band light, and a third liquid crystal deflector configured to deflect the third wavelength band light incident from the third wavelength selective polarizer, and output the first wavelength band light and the second wavelength band light incident from the third wavelength selective polarizer without deflection, the third liquid crystal deflector including liquid crystal molecules and a third optical path change surface.

The controller may be further configured to control a shape of the first optical path change surface such that the first optical path change surface includes two surfaces inclined at different angles to deflect the first wavelength band light incident on the first liquid crystal deflector in two directions, respectively, the controller may be further configured to control a shape of the second optical path change surface such that the second optical path change surface has two surfaces inclined at different angles to deflect the second wavelength band light incident on the second liquid crystal deflector in the two directions, respectively, and the controller may be further configured to control a shape of the third optical path change surface such that the third optical path change surface has two surfaces inclined at different angles to deflect the third wavelength band light incident on the third liquid crystal deflector in the two directions, respectively.

The controller may be further configured to control the first liquid crystal deflector, the second liquid crystal deflector, and the third liquid crystal deflector such that the first wavelength band light, the second wavelength band light, and the third wavelength band light are simultaneously deflected in the two directions, respectively.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
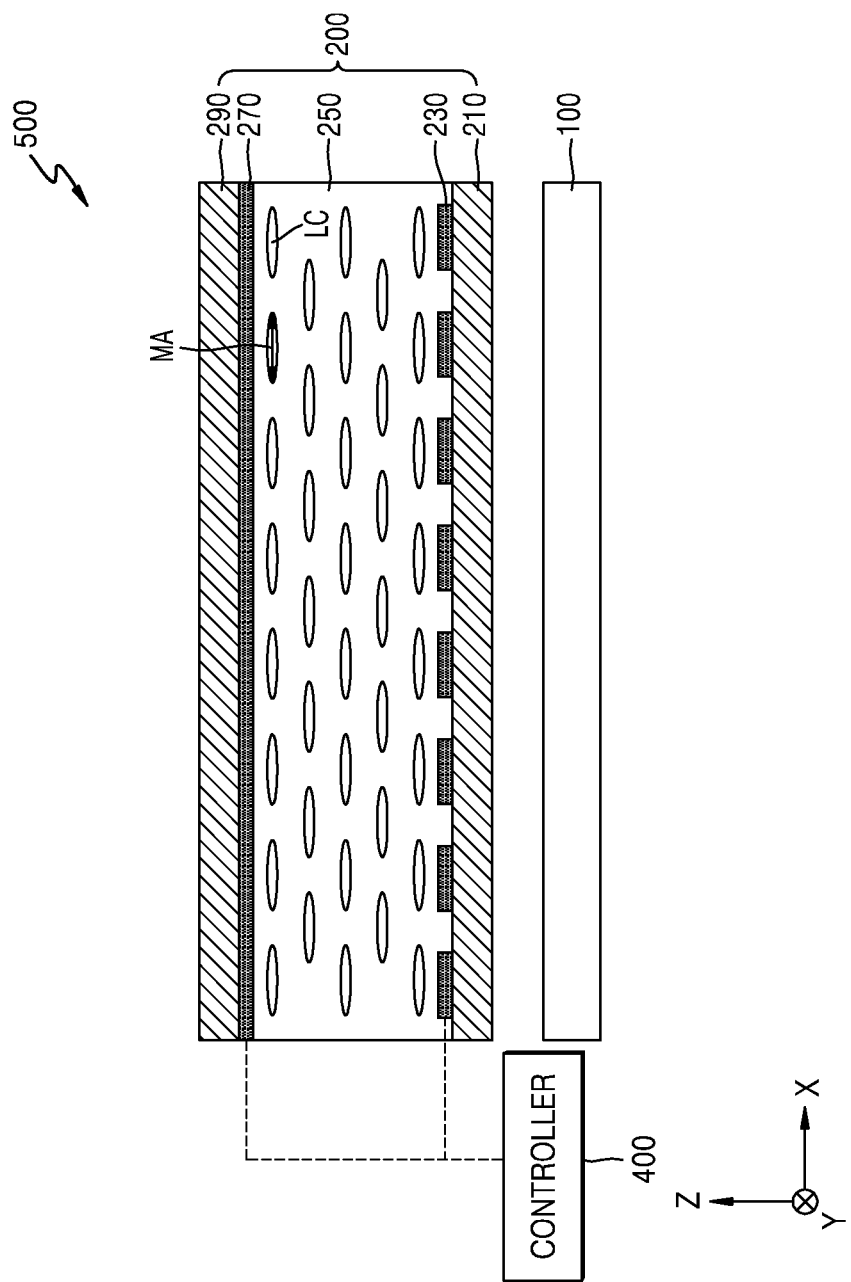
FIG. 1 is a cross-sectional view illustrating a beam deflector according to an example embodiment.

Reference will now be made in detail to example embodiments, examples of which are illustrated in the accompanying drawings. In this regard, the example embodiments may have different forms and should not be construed as being limited to the descriptions set forth herein. Accordingly, the example embodiments are merely described below, by referring to the figures, to explain aspects.

The example embodiments described herein are for illustrative purposes only, and various modifications may be made therefrom. In the drawings, like reference numerals refer to like elements, and the sizes of elements may be exaggerated for clarity of illustration.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. The use of the terms "a" and "an" and "the" and similar referents are to be construed to cover both the singular and the plural.

In the following description, when an element is referred to as being "above" or "on" another element, it may be directly on the other element while making contact with the other element or may be above the other element without making contact with the other element.

As used herein, the singular forms "a," "an" and "the" are intended to include the plural forms as well, unless the context clearly indicates otherwise. It will be further understood that the terms "comprises," "comprising," "includes," and/or "including" used herein specify the presence of stated features or elements, but do not preclude the presence or addition of one or more other features or elements.

An element referred to with the definite article or a demonstrative pronoun may be construed as the element or the elements even though it has a singular form.

Operations of a method may be performed in appropriate order unless explicitly described in terms of order or described to the contrary. In addition, examples or exemplary terms (for example, "such as" and "etc.") are used for the purpose of description and are not intended to limit the scope of the inventive concept unless defined by the claims.

Figure 2:
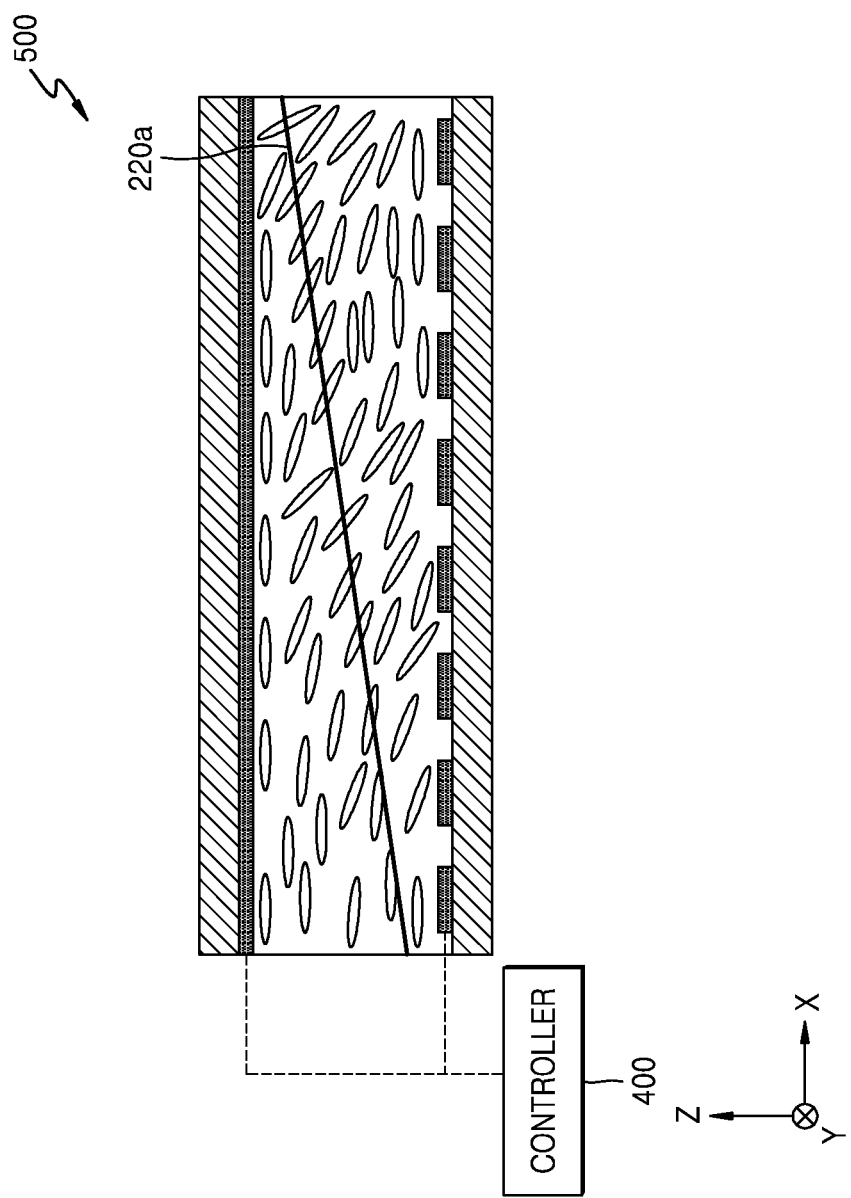
FIG. 2 is a view illustrating varying an optical path change surface of the beam deflector illustrated in FIG. 1.

FIG. 1 is a cross-sectional view illustrating a schematic configuration of a beam deflector 500 according to an example embodiment, and FIG. 2 is a view illustrating the concept of varying an optical path change surface 220a of the beam deflector 500 illustrated in FIG. 1.

The beam deflector 500 includes a wavelength selective polarizer 100 configured to convert a polarization state of light in a particular wavelength band into a first polarization state, a liquid crystal deflector 200 configured to deflect light incident from the wavelength selective polarizer 100, and a controller 400 configured to control the liquid crystal deflector 200.

The wavelength selective polarizer 100 is a device configured to convert polarization of incident light by delaying a phase of the incident light, and the material of the wavelength selective polarizer 100 is determined such that the conversion may be performed on light in a particular wavelength band. For example, the wavelength selective polarizer 100 may include an optically anisotropic material having wavelength selectivity such as a polymer, an inorganic material, liquid crystals, or calcite. Optical anisotropy may refer to a property exhibiting different refractive indexes according to the polarization state of incident light, and the optically anisotropic material having wavelength selectivity may be used to vary the polarization state of light in a particular wavelength band.

The wavelength selective polarizer 100 may convert the polarization state of a light beam in a particular wavelength band from among incident light beams. For example, the wavelength selective polarizer 100 may covert a polarization state of red light into a first polarization state, e.g., a P-polarized state indicating an X-axis direction as shown in FIGS. 1 and 2. The particular wavelength band may be, for example, a red wavelength band, a green wavelength band, or a blue wavelength band. The wavelength selective polarizer 100 is employed to use the property that only light having a polarization state corresponding to the direction of major axes MA of liquid crystal molecules LC of the liquid crystal deflector 200 is controlled in the liquid crystal deflector 200. Using the property, only light in a particular wavelength band can be direction-controlled in the liquid crystal deflector 200.

The liquid crystal deflector 200 may include a liquid crystal layer 250 having liquid crystal molecules LC, and first and second electrode parts 230 and 270 for controlling the liquid crystal molecules LC. The first and second electrode parts 230 and 270 may be placed on first and second substrates 210 and 290 arranged in parallel with each other and mutually facing each other, and the liquid crystal layer 250 is placed between the first and second substrates 210 and 290. The first and second substrates 210 and 290 may be insulative substrates including, for example, glass or a transparent plastic material.

The first electrode part 230 may include a plurality of sub-electrodes, and voltages applied to the sub-electrodes may be individually controlled. The sub-electrodes may have a stripe shape extending in a direction such as a y-axis direction and may be arranged side by side in the x-axis direction. The second electrode part 270 may be a flat-plate-type common electrode, and a reference voltage may be applied to the second electrode part 270 to apply a voltage between the second electrode part 270 and each of the sub-electrodes of the first electrode part 230. The first and second electrode parts 230 and 270 may include a transparent conductive material such as, for example, indium-tin-oxide (ITO), indium-zinc-oxide (IZO), or indium-tin-zinc-oxide (ITZO).

The liquid crystal molecules LC are initially arranged such that the direction of the major axes MA of the liquid crystal molecules LC may be parallel with a certain direction, for example, the x-axis direction. For example, the certain direction may be a first polarization direction along which conversion is performed by the wavelength selective polarizer 100. Alignment layers may be further provided on the first and second substrates 210 and 290 for liquid crystal alignment.

As shown in FIG. 2, the liquid crystal deflector 200 may have the optical path change surface 220a. The optical path change surface 220a may be formed by varying an arrangement of the liquid crystal molecules LC by applying a voltage between the first and second electrode parts 230 and 270. The shape of the optical path change surface 220a may be varied according to an applied voltage. The optical path change surface 220a is formed because the liquid crystal molecules LC have different refractive indexes in the direction of the major axes MA and a minor-axis direction perpendicular to the major-axis direction. In other words, the liquid crystal molecules LC have different refractive indexes for incident light having a polarization direction parallel with the major-axis direction and incident light having a polarization direction perpendicular to the major-axis direction.

As shown in FIG. 1, in an initial arrangement state in which no voltage is applied between the first and second electrode parts 230 and 270, all the liquid crystal molecules LC are aligned in parallel with each other, and the refractive index of the liquid crystal molecules LC with respect to uniformly-polarized light is the same at any position.

However, as shown in FIG. 2, if an electric field is formed in the liquid crystal layer 250 due to a voltage applied between the first and second electrode parts 230 and 270, the liquid crystal molecules LC are aligned according to the direction of the electric field. For example, if the liquid crystal molecules LC have positive dielectric anisotropy, directors of the liquid crystal molecules LC may be arranged in the direction of the electric field, that is, the major-axis direction of the liquid crystal molecules LC may be aligned in the direction of the electric field, and if the liquid crystal molecules LC have negative dielectric anisotropy, the major-axis direction of the liquid crystal molecules LC may be aligned in a direction perpendicular to the direction of the electric field. Different voltages may be applied to the sub-electrodes of the first electrode part 230, and in this case, the liquid crystal molecules LC may be differently arranged depending on the position of the liquid crystal molecules LC with respect to the sub-electrodes. Since the liquid crystal molecules LC have different refractive indexes in the major-axis direction and the minor-axis direction, the liquid crystal molecules LC may have a refractive index gradient according to the distribution of the directors of the liquid crystal molecules LC. The refractive index gradient in the liquid crystal layer 250 is expressed as an interface at which refractive index variations occur, and the interface is the optical path change surface 220a. Incident light is refracted at the interface, and thus, the liquid crystal deflector 200 may output light deflected in a predetermined direction. The slope of the optical path change surface 220a may be determined by adjusting the distribution of the directors of the liquid crystal molecules LC using the distribution of an electric field in the liquid crystal layer 250. In other words, the deflection direction of incident light may be adjusted according to voltage applied between the first and second electrode parts 230 and 270.

The optical path change surface 220a is formed by the arrangement of the directors of the liquid crystal molecules LC because the major-axis direction of the liquid crystal molecules LC is varied according to positions in the liquid crystal layer 250. Therefore, the optical path change surface 220a has an effect only on light polarized in a direction parallel with the major-axis direction of the liquid crystal molecules LC in the initial arrangement state, for example, light polarized in a direction parallel with the x-axis direction. Hereinafter, a polarization state parallel with the x-axis direction will be referred to as a first polarization state and indicated by ↔.

When the liquid crystal molecules LC are arranged as shown in FIG. 2, the major-axis direction of the liquid crystal molecules LC varies according to the position of the liquid crystal molecules LC, but the minor-axis direction of the liquid crystal molecules LC is the same as the y-axis direction. Therefore, if light polarized in the y-axis direction is incident on the liquid crystal layer 250, the light is not deflected. Hereinafter, a polarization state parallel with the y-axis direction will be referred to as a second polarization state and indicated by ⊙.

In other words, if light polarized in a direction parallel with the x-axis direction, that is, light having the first polarization state ↔, is incident on the liquid crystal layer 250, the light is deflected by the optical path change surface 220a according to the inclined angle of the optical path change surface 220a. However, light polarized in a direction parallel with the y-axis direction, that is, light having the second polarization state ⊙, is incident on the liquid crystal layer 250, the light passes through the liquid crystal layer 250 without deflection.

Figure 3:
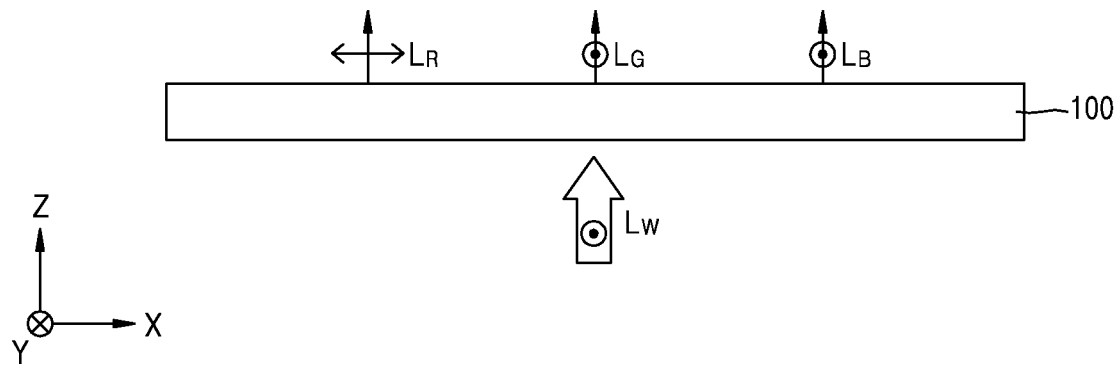
FIG. 3 illustrates an example showing conversion of polarization of light according to color of light passing through a wavelength selective polarizer of the beam deflector of FIG. 1.

FIG. 3 illustrates an example in which the conversion of polarization of light is shown according to the color of the light when the light passes through the wavelength selective polarizer 100 of the beam deflector 500 illustrated in FIG. 1.

For example, the wavelength selective polarizer 100 may convert the polarization state of light in a red wavelength band into the first polarization state ↔. If white light $L_W$ having the second polarization state ⊙ is incident on the wavelength selective polarizer 100, red light $L_R$, green light $L_G$, and blue light $L_B$ included in the white light $L_W$ are output with different polarization directions by the wavelength selective polarizer 100. Here, if the wavelength selective polarizer 100 performs polarization conversion on a red wavelength band, the polarization state of the red light $L_R$ is converted into the first polarization state ↔, and the green light $L_G$ and the blue light $L_B$ are output with the same polarization state, that is, the second polarization state ⊙.

If the polarization state of light to be incident on the liquid crystal deflector 200 is adjusted differently according to colors by using the above-described characteristics of the wavelength selective polarizer 100, it is possible that only light in a particular wavelength band can be deflected.

By deflecting only light in a selected wavelength band as described above, scattering of light may be reduced when the beam deflector 500 is applied to a display device.

Figure 4A:
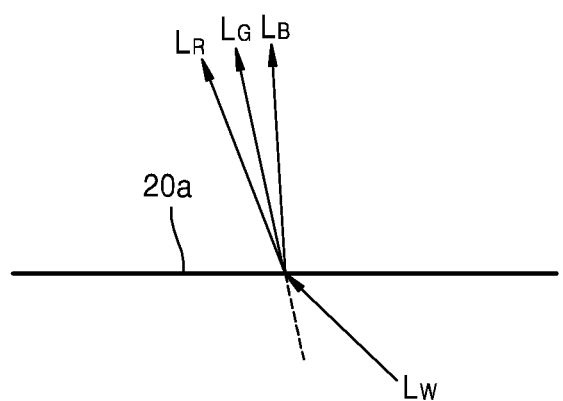
FIGS. 4A and 4B are views illustrating scattering of light caused by a general beam deflector, and a method of reducing such scattering of light.
Figure 4B:
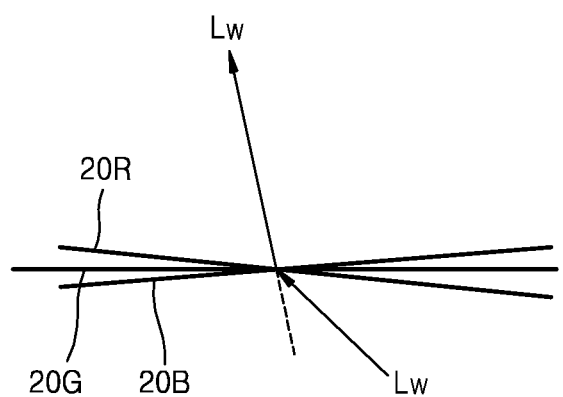

FIGS. 4A and 4B are schematic views illustrating scattering of light that may be caused by a general beam deflector, and a method of reducing such scattering of light.

Referring to FIG. 4A, white light $L_W$ incident on the beam deflector is deflected by an optical path change surface 20a. The deflection direction is determined by the difference between the refractive indexes of two media between which the optical path change surface 20a is formed as an interface and the inclined angle of the optical path change surface 20a. The refractive indexes of the media may slightly vary according to the wavelength of incident light. Therefore, when white light $L_W$ is deflected at the optical path change surface 20a, the deflection directions of the red light $L_R$, green light $L_G$, and blue light $L_B$ are minutely different, which may lead to scattering and may cause image quality deterioration.

Referring to FIG. 4B, to remove such scattering, white light $L_W$ may be deflected by different optical path change surfaces 20R, 20G, and 20B according to colors. Thus, the white light $L_W$ may be deflected in the same direction. This may be accomplished by a time-multiplexing method in which an optical path change surface 20R is formed in a first time frame to deflect red light in a predetermined direction, an optical path change surface 20G inclined at a different angle is formed in a second time frame to deflect green light in the same predetermined direction, and an optical path change surface 20B inclined at an angle different from the inclined angles of the optical path change surface 20R and the optical path change surface 20G is formed in a third time frame to deflect blue light in the same predetermined direction. If the intervals between such time frames are sufficiently short, incident white light $L_W$ may appear to be simultaneously deflected in the same direction.

In a spatial-multiplexing method, the region of the beam deflector is divided into a region in which an optical path change surface 20R is formed to deflect red light in a predetermined direction, a region in which an optical path change surface 20G inclined at a different angle is formed to deflect green light in the same predetermined direction, and a region in which an optical path change surface 20B inclined at a different angle is formed to deflect blue light in the same predetermined direction. If the intervals between such regions are sufficiently small, incident white light $L_W$ may appear to be simultaneously deflected in the same direction.

In a beam deflector according to an example embodiment, optical path change surfaces 20R, 20G, and 20B may be separately formed so that red light, green light, and blue light included in white light $L_W$ are deflected in the same direction, as shown in FIG. 4B. However, the optical path change surfaces 20R, 20G, and 20B may be configured to deflect only corresponding colors, which is different from the spatial-multiplexing method or the time-multiplexing method.

Figure 5:
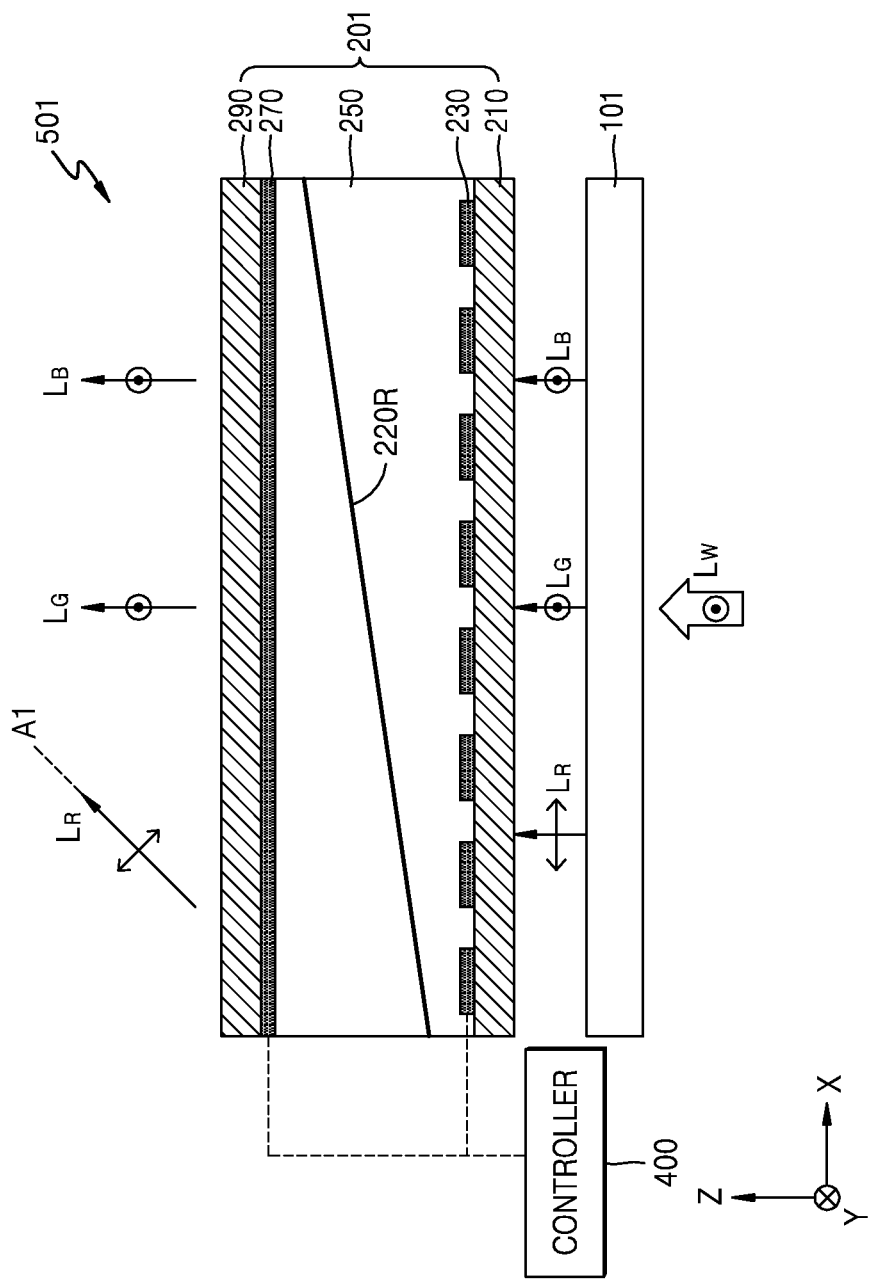
FIG. 5 is a cross-sectional view illustrating a beam deflector according to an example embodiment.

FIG. 5 is a cross-sectional view illustrating a beam deflector 501 according to an example embodiment.

The beam deflector 501 includes a first wavelength selective polarizer 101 configured to convert the polarization state of light in a red wavelength band into a first polarization state ↔, a first liquid crystal deflector 201 configured to deflect light incident from the first wavelength selective polarizer 101, and a controller 400 configured to control the first liquid crystal deflector 201.

The first liquid crystal deflector 201 includes a first optical path change surface 220R which may vary according to the behavior of liquid crystal molecules forming a liquid crystal layer 250. The slope of the first optical path change surface 220R may be adjusted by a voltage applied between first and second electrode parts 230 and 270 by the controller 400 to deflect red light $L_R$ in a first direction A1.

If white light $L_W$ is incident on the beam deflector 501, the first wavelength selective polarizer 101 converts the polarization state of red light $L_R$ into the first polarization state ↔ while maintaining the polarization state of green light $L_G$ and blue light $L_B$ in a second polarization state ⊙. Then, light output from the first wavelength selective polarizer 101 is incident on the first liquid crystal deflector 201.

As described above, the first optical path change surface 220R of the first liquid crystal deflector 201 refracts light having only the first polarization state ↔. Therefore, red light $L_R$ having the first polarization state ↔ is deflected in the first direction A1 and output from the beam deflector 501, and green light $L_G$ and blue light $L_B$ having the second polarization state ⊙ are output without being deflected from the beam deflector 501.

Figure 6:
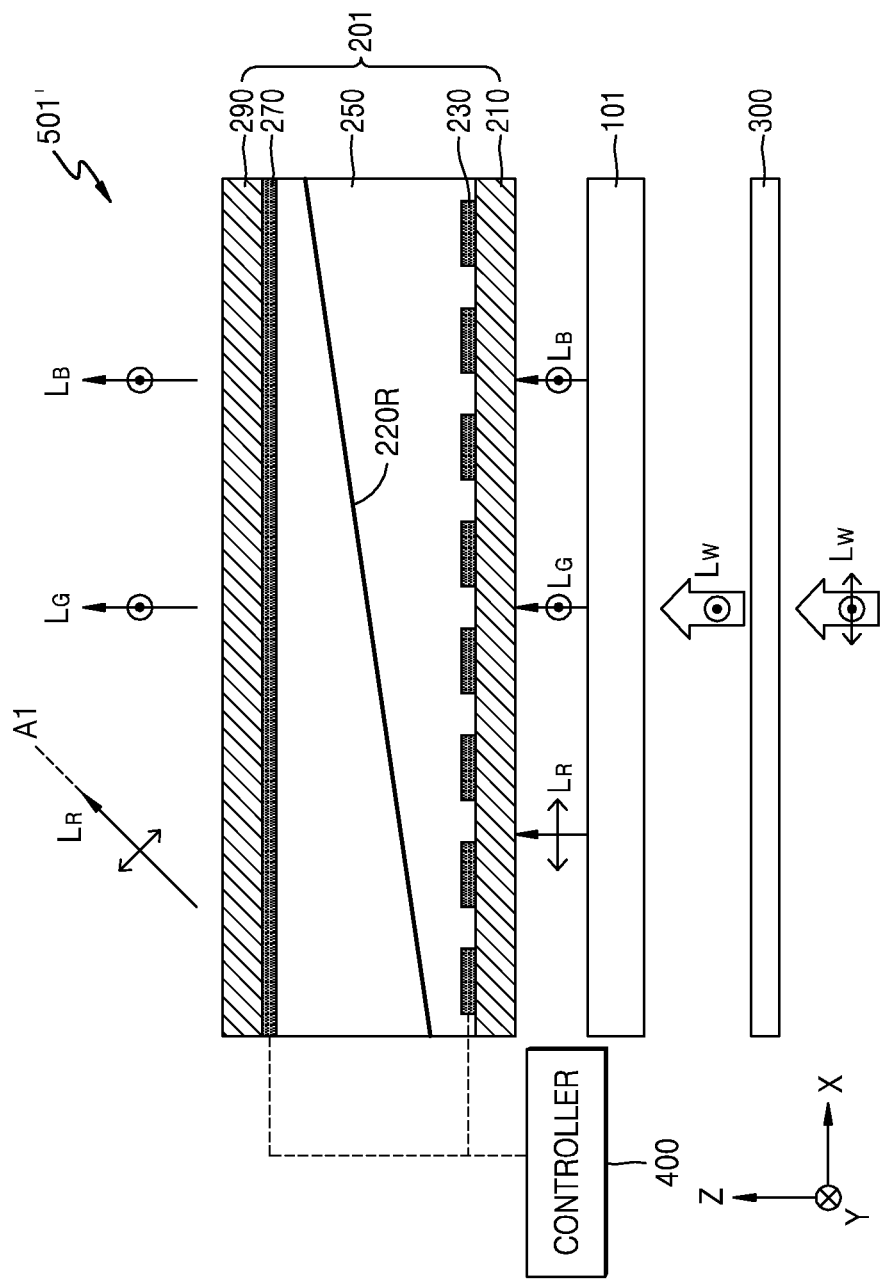
FIG. 6 is a cross-sectional view illustrating a beam deflector according to an example embodiment.

FIG. 6 is a cross-sectional view schematically illustrating a beam deflector 501' according to an example embodiment.

The beam deflector 501' is different from the beam deflector 501 illustrated in FIG. 5 in that a polarizer 300 is further provided on light incident side of the first wavelength selective polarizer 101. The polarizer 300 has a polarization axis in the direction of the second polarization state ⊙ such that light having the second polarization state ⊙ perpendicular to the first polarization state ↔ may be incident on the first wavelength selective polarizer 101. The polarizer 300 may absorb light having the first polarization state ↔ and transmit light having the second polarization state ⊙.

As described with reference to FIG. 5, when red light $L_R$ having the first polarization state ↔, and green light $L_G$ and blue light $L_B$ having the second polarization state ⊙ are incident on the first liquid crystal deflector 201, only the red light $L_R$ is deflected and output from the first liquid crystal deflector 201.

However, since the beam deflector 501' of an example embodiment further includes the polarizer 300 having a polarization axis in the direction of the second polarization state ⊙, the beam deflector 501' may deflect only red light $L_R$ of white light $L_W$ having various polarization directions.

If white light $L_W$ having both the first polarization state ↔ and the second polarization state ⊙ is incident on the beam deflector 501', the white light $L_W$ is converted into white light $L_W$ having only the second polarization state ⊙ by the polarizer 300, and is then incident on the first wavelength selective polarizer 101. Next, by the first wavelength selective polarizer 101, red light $L_R$ having the first polarization state ↔, and green light $L_G$ and blue light $L_B$ having the second polarization state ⊙ may be incident on the first liquid crystal deflector 201. The first optical path change surface 220R of the first liquid crystal deflector 201 deflects light having only the first polarization state ↔. Therefore, red light $L_R$ is deflected in the first direction A1 and output from the beam deflector 501', and green light $L_G$ and blue light $L_B$ are output without being deflected from the beam deflector 501'.

Figure 7:
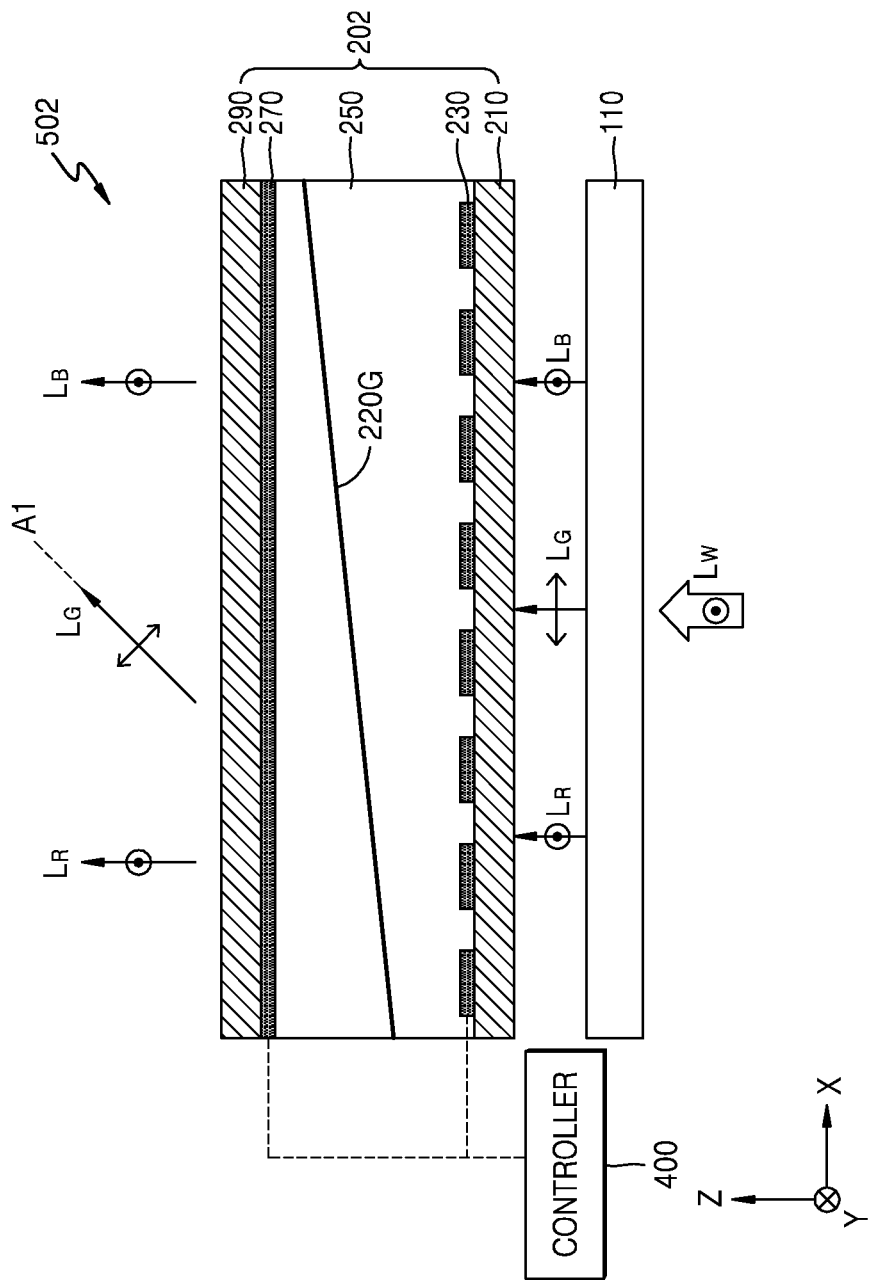
FIG. 7 is a cross-sectional view illustrating a beam deflector according to an example embodiment.

FIG. 7 is a cross-sectional view schematically illustrating a beam deflector 502 according to an example embodiment.

The beam deflector 502 of the example embodiment is different from the beam deflector 501 of FIG. 5 in that the beam deflector 502 deflects only green light $L_G$ in a predetermined direction.

The beam deflector 502 includes a second wavelength selective polarizer 110 configured to convert the polarization state of light in a green wavelength band into a first polarization state ↔, a second liquid crystal deflector 202 configured to deflect light incident from the second wavelength selective polarizer 110, and a controller 400 configured to control the second liquid crystal deflector 202. The second liquid crystal deflector 202 includes a second optical path change surface 220G that is variable. The slope of the second optical path change surface 220G is adjusted by a voltage applied between first and second electrode parts 230 and 270 by the controller 400 to deflect green light $L_G$ in a first direction A1. If white light $L_W$ having a second polarization state ⊙ is incident on the beam deflector 502, the white light $L_W$ passes through the second wavelength selective polarizer 110, and the polarization state of green light $L_G$ is converted into the first polarization state ↔, while the polarization state of red light $L_R$ and blue light $L_B$ are maintained in the second polarization state ⊙. Then, light output from the second wavelength selective polarizer 110 is incident on the second liquid crystal deflector 202. The second optical path change surface 220G of the second liquid crystal deflector 202 is inclined at an angle to deflect green light $L_G$ in the first direction A1. The refractive index of liquid crystal molecules slightly varies according to the wavelength of light. Therefore, the angle of slope of the second optical path change surface 220G for deflecting green light $L_G$ in the first direction A1 may be different from the angle of slope of the first optical path change surface 220R of FIG. 5 for deflecting red light $L_R$ in the first direction A1. The second optical path change surface 220G deflects light having only the first polarization state ↔. Therefore, green light $L_G$ having the first polarization state ↔ is deflected in the first direction A1 and output from the beam deflector 502, and red light $L_R$ and blue light $L_B$ having the second polarization state ⊙ are output without being deflected from the beam deflector 502.

Figure 8:
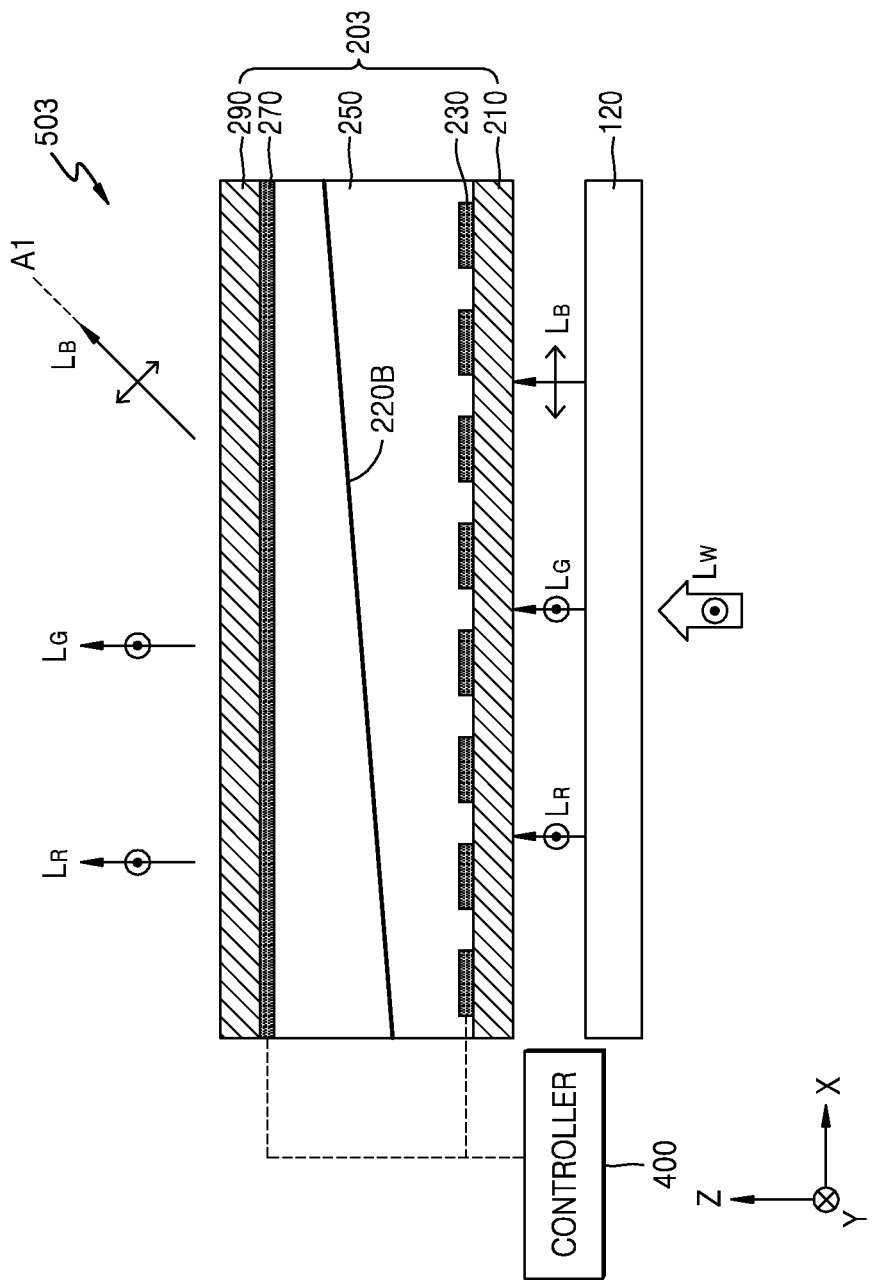
FIG. 8 is a cross-sectional view illustrating a beam deflector according to an example embodiment.

FIG. 8 is a cross-sectional view illustrating a beam deflector 503 according to an example embodiment.

The beam deflector 503 of the example embodiment is different from the beam deflector 501 of FIG. 5 and the beam deflector 502 of FIG. 7, in that the beam deflector 503 deflects only blue light $L_B$ in a predetermined direction.

The beam deflector 503 includes a third wavelength selective polarizer 120 configured to convert the polarization state of light in a blue wavelength band into a first polarization state ↔, a third liquid crystal deflector 203 configured to deflect light incident from the third wavelength selective polarizer 120, and a controller 400 configured to control the third liquid crystal deflector 203. The third liquid crystal deflector 203 includes a third optical path change surface 220B that is variable. The slope of the third optical path change surface 220B is adjusted by a voltage applied between first and second electrode parts 230 and 270 by the controller 400 to deflect blue light $L_B$ in a first direction A1.

If white light $L_W$ having a second polarization state ⊙ is incident on the beam deflector 503, the white light $L_W$ passes through the third wavelength selective polarizer 120 while the polarization state of blue light $L_B$ is converted into the first polarization state ↔ and the polarization state of red light $L_R$ and green light $L_G$ are maintained in the second polarization state ⊙q. Then, light output from the third wavelength selective polarizer 120 is incident on the third liquid crystal deflector 203.

The third optical path change surface 220B of the third liquid crystal deflector 203 is inclined at an angle to deflect blue light $L_B$ in the first direction A1. The refractive index of liquid crystal molecules slightly varies according to the wavelength of light. Therefore, the angle of slope of the third optical path change surface 220B for deflecting blue light $L_B$ in the first direction A1 may be different from the angle of slope of the first optical path change surface 220R of FIG. 5 for deflecting red light $L_R$ in the first direction A1 and the angle of slope of the second optical path change surface 220G of FIG. 7 for deflecting green light $L_G$ in the first direction A1.

The third optical path change surface 220B of the third liquid crystal deflector 203 refracts light having only the first polarization state ↔. Therefore, blue light $L_B$ having the first polarization state ↔ is deflected in the first direction A1 and output from the beam deflector 503, and red light $L_R$ and green light $L_G$ having the second polarization state ⊙ are output without being deflected from the beam deflector 503.

Each of the beam deflectors 502 and 503 illustrated in FIGS. 7 and 8 may further include a polarizer 300 similar to the beam deflector 501' illustrated in FIG. 6. In this case, when white light $L_W$ having both the first polarization state ↔ and the second polarization state ⊙ is incident on the beam deflectors 502 and 503, by the polarizers 300, white light $L_W$ having only the second polarization state ⊙ is incident on the second wavelength selective polarizer 110 and the third wavelength selective polarizer 120.

Figure 9:
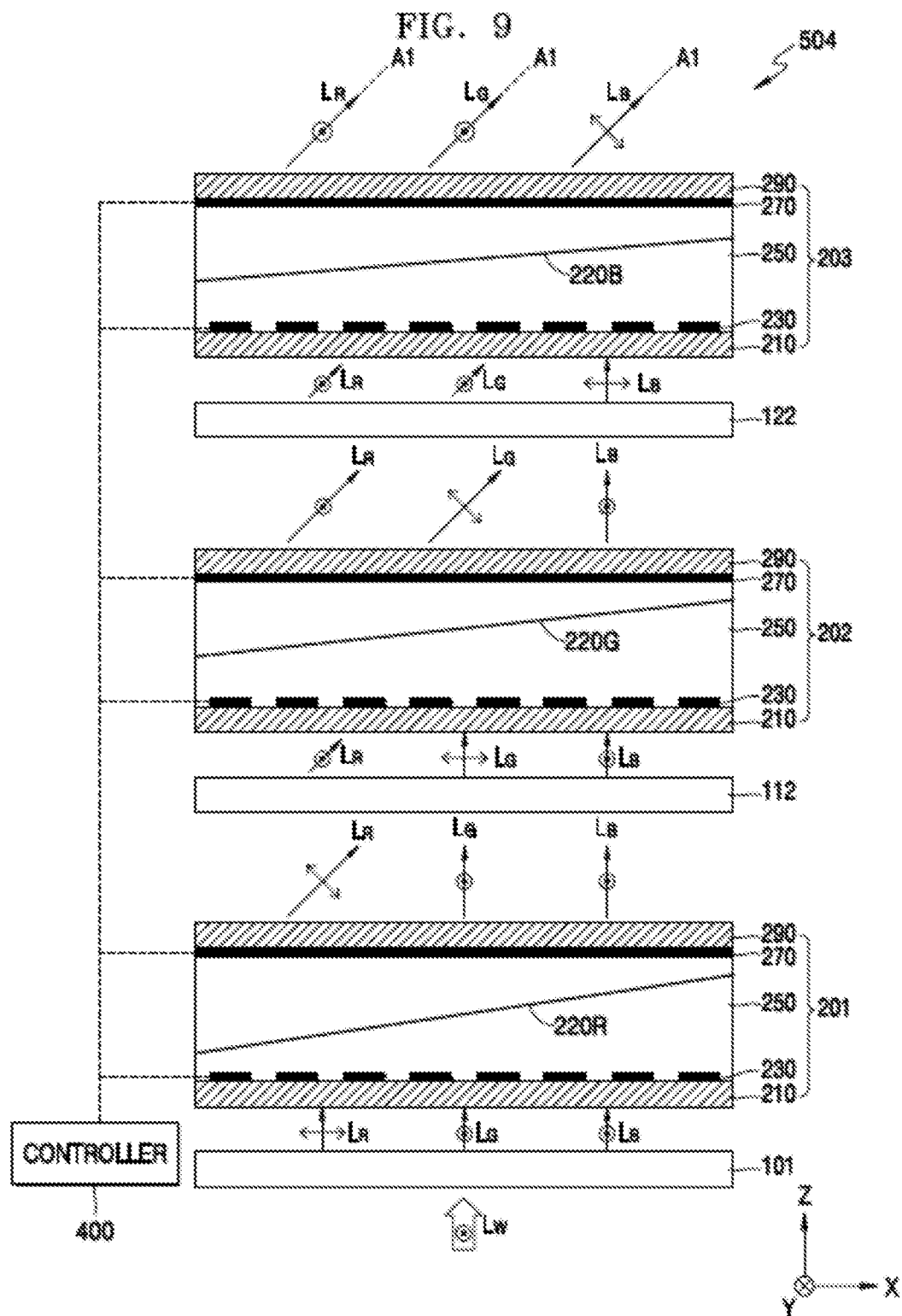
FIG. 9 is a cross-sectional view illustrating a beam deflector according to an example embodiment.

FIG. 9 is a cross-sectional view illustrating a beam deflector 504 according to an example embodiment.

The beam deflector 504 is provided by stacking structures of wavelength selective polarizers and liquid crystal deflectors configured to deflect light in different wavelength bands in a predetermined direction in a light propagation direction.

The beam deflector 504 includes a first wavelength selective polarizer 101 configured to convert the polarization state of light in a first wavelength band into a first polarization state ↔, a first liquid crystal deflector 201 having a first optical path change surface 220R to deflect light incident from the first wavelength selective polarizer 101, a second wavelength selective polarizer 112 placed along an optical path of light passing through the first liquid crystal deflector 201 to convert the polarization state of light in a second wavelength band into the first polarization state ↔, a second liquid crystal deflector 202 having a second optical path change surface 220G to deflect light incident from the second wavelength selective polarizer 112, a third wavelength selective polarizer 122 configured to convert the polarization state of light in a third wavelength band into the first polarization state ↔, a third liquid crystal deflector 203 having a third optical path change surface 220R to deflect light incident from the third wavelength selective polarizer 122, and a controller 400 configured to control the first to third liquid crystal deflectors 201, 202, and 203.

The controller 400 controls the first liquid crystal deflector 201, the second liquid crystal deflector 202, and the third liquid crystal deflector 203 such that the first optical path change surface 220R, the second optical path change surface 220G, and the third optical path change surface 220B may be inclined at different angles to respectively deflect light in the first wavelength band and the first polarization state ↔, light in the second wavelength band and the first polarization state ↔, and light in the third wavelength band and the first polarization state ↔ in the same direction, for example, a first direction A1.

If white light $L_W$ having a second polarization state ⊙ is incident on the beam deflector 504, the white light $L_W$ is split by the first wavelength selective polarizer 101 into red light $L_R$ having the first polarization state ↔, green light $L_G$ having the second polarization state ⊙, and blue light $L_B$ having the second polarization state ⊙.

The red light $L_R$ having the first polarization state ↔, the green light $L_G$ having the second polarization state ⊙, and the blue light $L_B$ having the second polarization state ⊙ are incident on the first liquid crystal deflector 201. The first optical path change surface 220R of the first liquid crystal deflector 201 is inclined at an angle to deflect the red light $L_R$ in the first direction A1. In addition, since the first optical path change surface 220R refracts light having only the first polarization state ↔, only the red light $L_R$ having the first polarization state ↔ is deflected, and the green light $L_G$ and blue light $L_B$ having the second polarization state ⊙ are output from the first liquid crystal deflector 201 without being deflected.

Next, the red light $L_R$ having the first polarization state ↔, the green light $L_G$ having the second polarization state ⊙, and the blue light $L_B$ having the second polarization state ⊙ are incident on the second wavelength selective polarizer 112. The second wavelength selective polarizer 112 may convert the polarization state of the green light $L_G$ into the first polarization state ↔. In addition, the second wavelength selective polarizer 112 coverts the first polarization state of the red light $L_R$ into the second polarization state ⊙, but does not change the second polarization state ⊙ of the blue light $L_B$. The second wavelength selective polarizer 112 may include an optically anisotropic material having wavelength selectivity in a wavelength band from green to red, and the second wavelength selective polarizer 112 may change the polarization state of light in the wavelength band from green to red by 90°. Based on the second wavelength selective polarizer 112, the red light $L_R$ having the second polarization state ⊙, the green light $L_G$ the first polarization state ↔, and the blue light $L_B$ having the second polarization state ⊙ are incident on the second liquid crystal deflector 202.

The second optical path change surface 220G of the second liquid crystal deflector 202 is inclined at an angle to deflect green light $L_G$ in the first direction A1. In addition, since the second optical path change surface 220G only deflects light having the first polarization state ↔, when the red light $L_R$ having the second polarization state ⊙, the green light $L_G$ having the first polarization state and the blue light $L_B$ having the second polarization state ⊙ are output through the second liquid crystal deflector 202, only the green light $L_G$ having the first polarization state ↔ is deflected. The red light $L_R$ having the second polarization state ⊙ is maintained in the direction deflected by the first liquid crystal deflector 201, and the blue light $L_B$ having the second polarization state ⊙ is maintained in the direction not deflected by the first liquid crystal deflector 201.

Next, the red light $L_R$ having the second polarization state ⊙, the green light $L_G$ having the first polarization state ↔, and the blue light $L_B$ having the second polarization state ⊙ are incident on the third wavelength selective polarizer 122. The third wavelength selective polarizer 122 may convert the second polarization state ⊙ of the blue light $L_B$ into the first polarization state ↔. In addition, the third wavelength selective polarizer 122 converts the first polarization state ↔ of the green light $L_G$ into the second polarization state ⊙ but does not affect the second polarization state ⊙ of the red light $L_R$. The third wavelength selective polarizer 122 may include an optically anisotropic material having wavelength selectivity in a wavelength band from blue to green, and may convert the polarization state of light in the wavelength band from blue to green by 90°. Based on the third wavelength selective polarizer 122, the red light $L_R$ having the second polarization state ⊙, the green light $L_G$ having the second polarization state ⊙, and the blue light $L_B$ having the first polarization state ↔ are incident on the third liquid crystal deflector 203.

The third optical path change surface 220B of the third liquid crystal deflector 203 is inclined at an angle to deflect blue light $L_B$ in the first direction A1. In addition, since the third optical path change surface 220B only deflects light having the first polarization state ↔, when the red light $L_R$ having the second polarization state ⊙, the green light $L_G$ having the second polarization state ⊙, and the blue light $L_B$ having the first polarization state ↔ are output through the third liquid crystal deflector 203, only the blue light $L_B$ having the first polarization state ↔ is deflected at the third optical path change surface 220B. The red light $L_R$ having the second polarization state ⊙ is maintained in the direction deflected by the first liquid crystal deflector 201, and the green light $L_G$ having the second polarization state ⊙ is maintained in the direction deflected by the second liquid crystal deflector 202.

As described above, the red light $L_R$, the green light $L_G$, and the blue light $L_B$ may be output from the beam deflector 504 in the same direction, that is, the first direction A1. The first to third optical path change surfaces 220R, 220G, and 220B are arranged in a superposing manner, and each of the first to third optical path change surfaces 220R, 220G, and 220B deflects light having a specific wavelength band and polarization. Therefore, white light $L_W$ incident on the beam deflector 504 may be deflected in a predetermined direction such as the first direction A1. Compared to beam deflectors of the related art having a spatial-multiplexing structure or a time-multiplexing structure according to colors, the beam deflector 504 of the example embodiment may provide a more simple configuration by, for example, deflecting light in a plurality of wavelength bands by using a single controller and more effectively deflecting incident light in a target direction.

Figure 10:
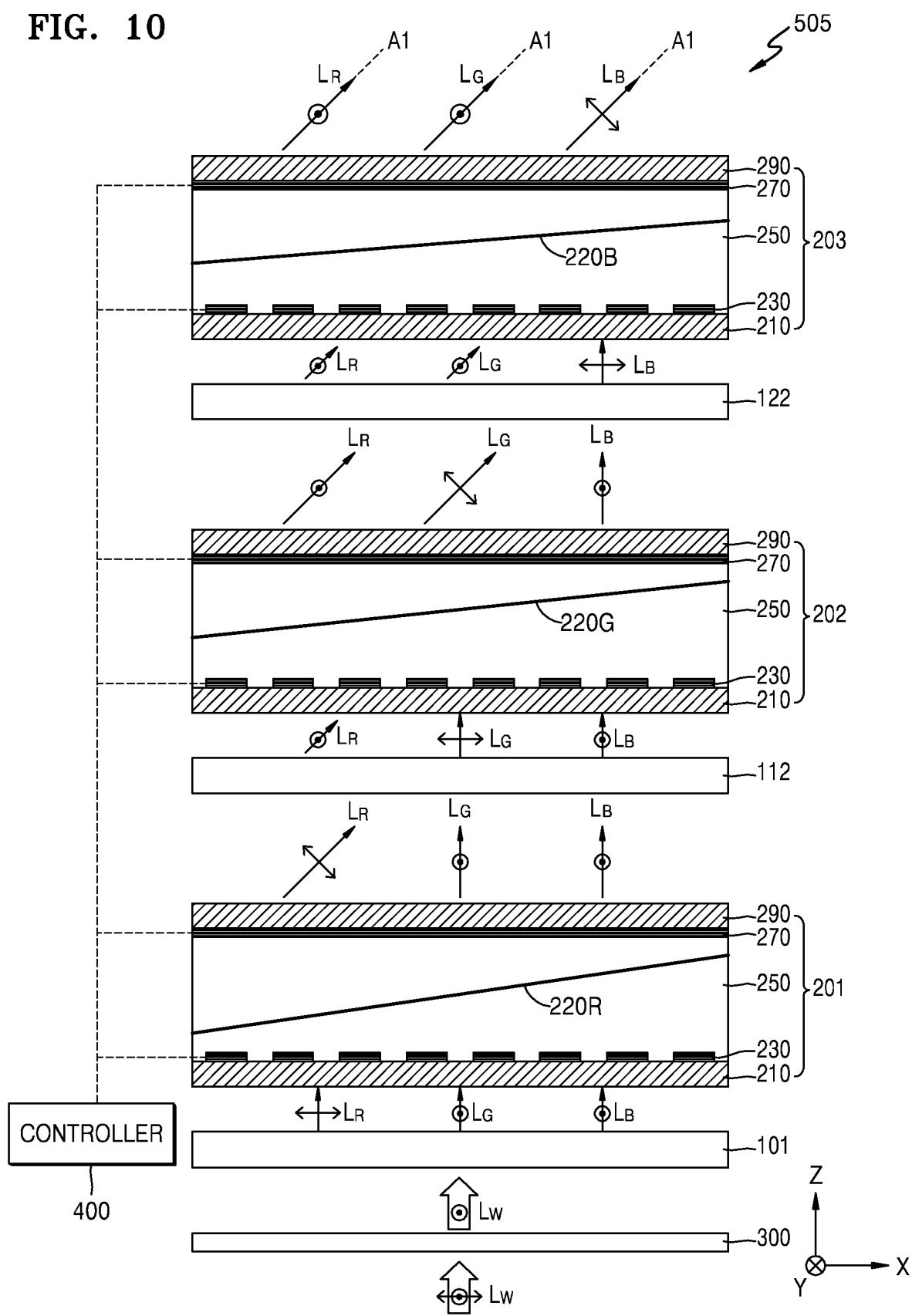
FIG. 10 is a cross-sectional view illustrating a beam deflector according to an example embodiment.

FIG. 10 is a cross-sectional view illustrating a beam deflector 505 according to an example embodiment.

The beam deflector 505 of the example embodiment is different from the beam deflector 504 of FIG. 9 in that the beam deflector 505 further includes a polarizer 300.

In FIG. 9, it is illustrated that white light $L_W$ having a second polarization state ⊙ is incident on the beam deflector 504. However, the beam deflector 505 of the example embodiment further includes the polarizer 300 having a polarization axis in the direction of the second polarization state ⊙ such that white light $L_W$ having the second polarization state ⊙ may be incident on a first wavelength selective polarizer 101. When white light $L_W$ having first polarization states ↔ and ⊙ is incident on the beam deflector 505, the polarizer 300 transmits light having only the second polarization state ⊙ toward the first wavelength selective polarizer 101. Next, by passing through a first liquid crystal deflector 201, a second wavelength selective polarizer 112, a second liquid crystal deflector 202, a third wavelength selective polarizer 122, and a third liquid crystal deflector 203, the white light $L_W$ deflected in a first direction A1 is output.

Figure 11:
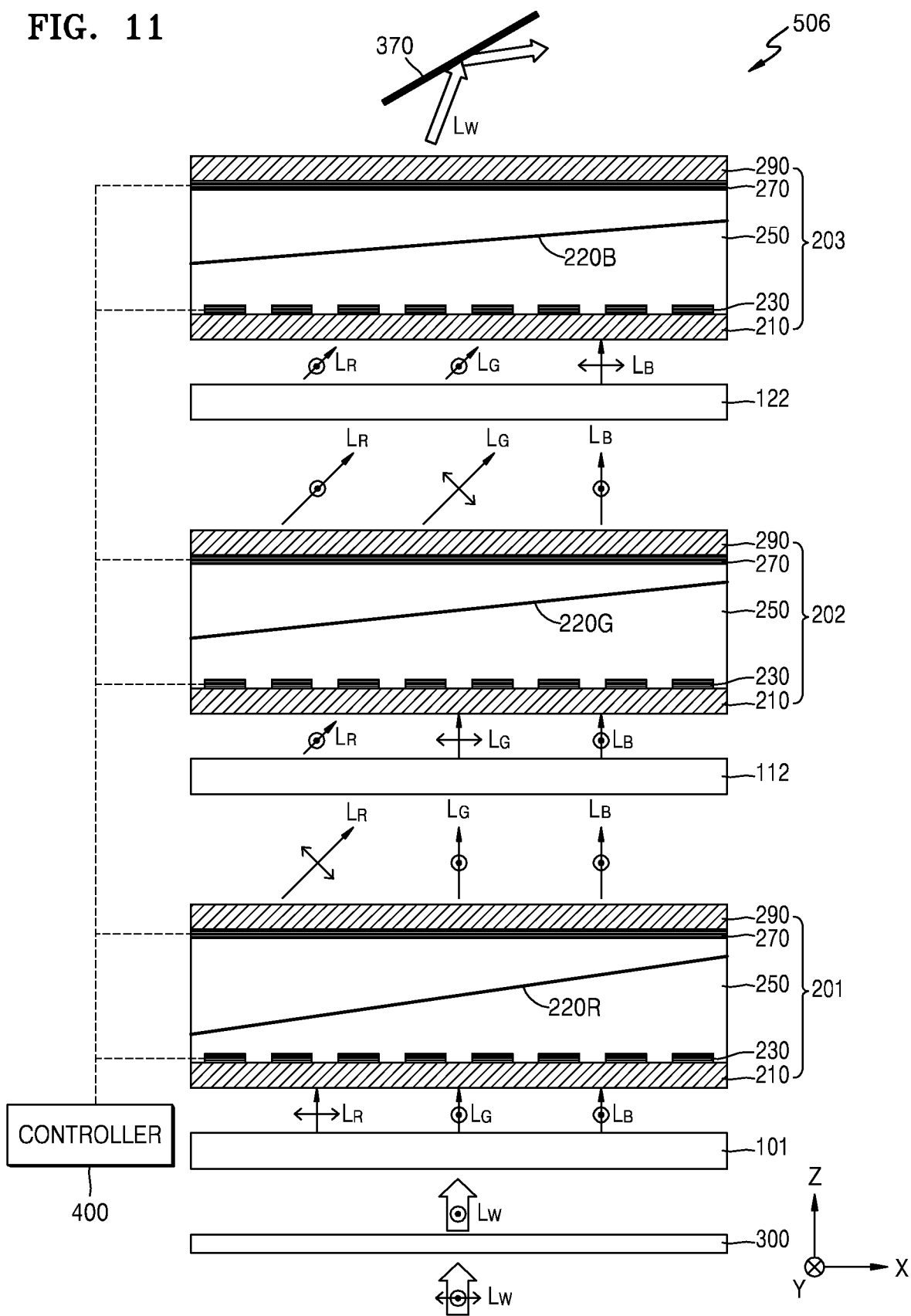
FIG. 11 is a cross-sectional view illustrating a beam deflector according to an example embodiment.

FIG. 11 is a cross-sectional view illustrating a beam deflector 506 according to an example embodiment.

The beam deflector 506 is different from the beam deflector 505 of FIG. 10 in that the beam deflector 506 further includes an optical path change member 370 configured to change the path of output white light $L_W$. Light deflected in a first direction by a first liquid crystal deflector 201, a second liquid crystal deflector 202, and a third liquid crystal deflector 203 may be further deflected by the optical path change member 370, and thus, a more fine adjustment to a target direction may be possible.

Figure 12:
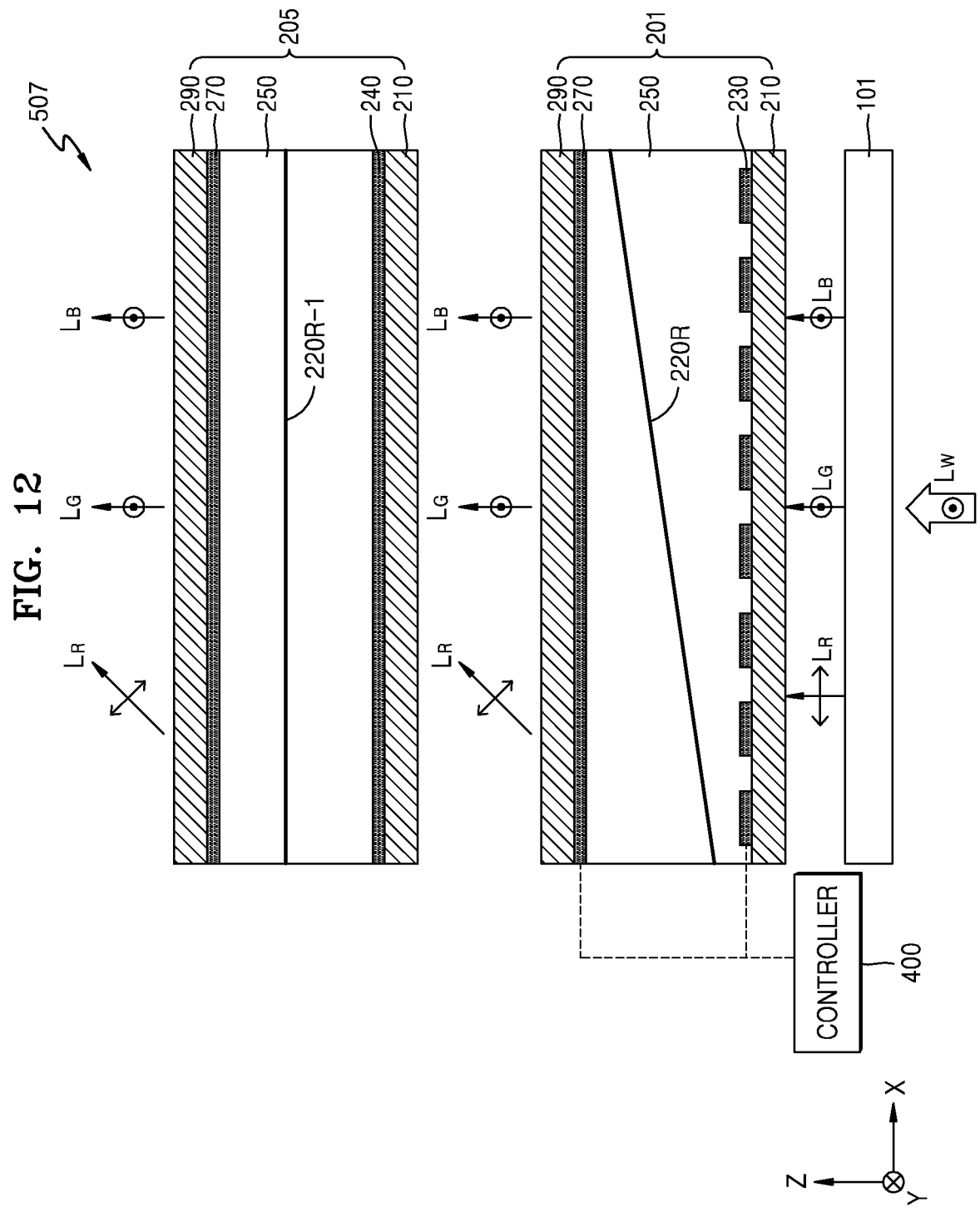
FIG. 12 is a cross-sectional view illustrating a beam deflector according to an example embodiment.

FIG. 12 is a cross-sectional view illustrating a beam deflector 507 according to an example embodiment.

The beam deflector 507 is different from the beam deflector 501 illustrated in FIG. 5 in that the beam deflector 507 further includes a first-second liquid crystal deflector 205 above a first liquid crystal deflector 201.

The first-second liquid crystal deflector 205 includes a first-second optical path change surface 220R-1 varying according to the behavior of liquid crystal molecules forming a liquid crystal layer 250. A first optical path change surface 200R of the first liquid crystal deflector 201 has a variable axis perpendicular to that of the first-second optical path change surface 220R-1 of the first-second liquid crystal deflector 205. For example, the variable axis of the first optical path change surface 220R may be in a y-axis direction, and the variable axis of the first-second optical path change surface 220R-1 may be in an x-axis direction. A plurality of sub-electrodes of a first electrode part 230 of the first liquid crystal deflector 201 may have a stripe shape extending in the y-axis direction and may be arranged side by side in the x-axis direction, and a plurality of sub-electrodes of a first electrode part 240 of the first-second liquid crystal deflector 205 may have a stripe shape extending in the x-axis direction and may be arranged side by side in the y-axis direction. In FIG. 12, only one sub-electrode of the first electrode part 240 of the first-second liquid crystal deflector 205 is illustrated.

When the beam deflector 507 deflects incident light, the two axis directions may be individually controlled to deflect the incident light in a target direction. If white light $L_W$ having a second polarization state ⊙ is incident on the beam deflector 507, the white light $L_W$ is split by a first wavelength selective polarizer 101 into red light $L_R$ having a first polarization state ↔, green light $L_G$ having the second polarization state ⊙, and blue light $L_B$ having the second polarization state ⊙. Then, the red light $L_R$, the green light $L_G$, and the blue light $L_B$ are incident on the first liquid crystal deflector 201. The first optical path change surface 220R of the first liquid crystal deflector 201 has an effect only on the first polarization state ↔. Therefore, only the red light $L_R$ having the first polarization state ↔ is deflected, and the green light $L_G$ and the blue light $L_B$ having the second polarization state ⊙ are not deflected. Next, the red light $L_R$ having the first polarization state ↔ is additionally deflected by the first-second optical path change surface 220R-1 of the first-second liquid crystal deflector 205 having a variable axis in the x-axis direction. Similarly, the first-second optical path change surface 220R-1 has an effect only on the first polarization state ↔. Thus, only the red light $L_R$ having the first polarization state ↔ is additionally deflected, and the green light $L_G$ and the blue light $L_B$ having the second polarization state ⊙ are not deflected.

It is illustrated that the beam deflector 507 deflects red light $L_R$ two-dimensionally with respect to two axis directions. However, such a structure for adjusting the deflection direction of light by a two-axis operation method may be added to the beam deflector 502 of FIG. 7 configured to deflect green light $L_G$ and the beam deflector 503 of FIG. 8 configured to deflect blue light $L_B$.

In addition, the first liquid crystal deflector 201, the second liquid crystal deflector 202, and the third liquid crystal deflector 203 of the beam deflector 506 illustrated in FIG. 9 may further include additional liquid crystal deflectors to deflect red light $L_R$, green light $L_G$, and blue light $L_B$ by a two-axis operation method.

Figure 13:
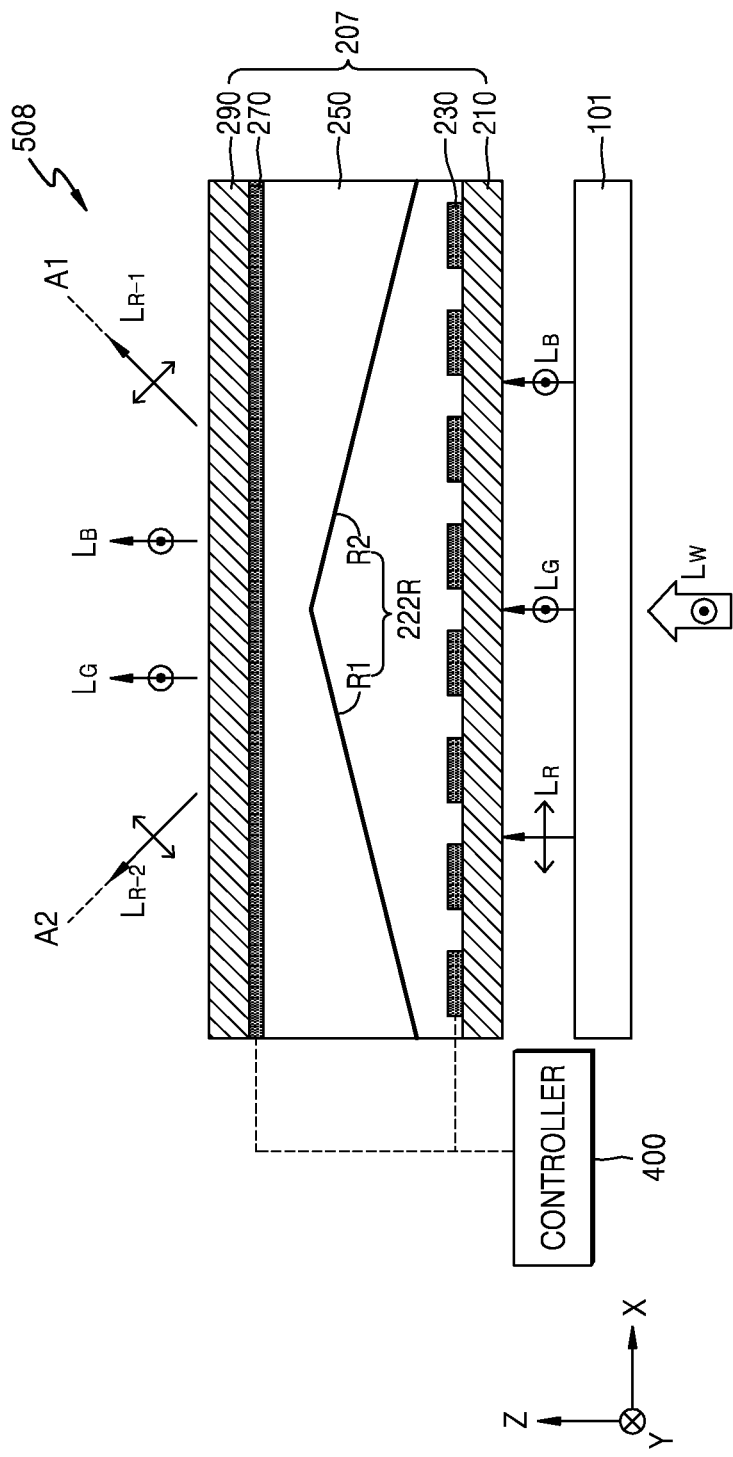
FIG. 13 is a cross-sectional view illustrating a beam deflector according to an example embodiment.

FIG. 13 is a cross-sectional view illustrating a beam deflector 508 according to an example embodiment.

The beam deflector 508 of the example embodiment is different from the beam deflector 501 of FIG. 5 in that a first optical path change surface 222R has two surfaces R1 and R2 inclined at different angles. A controller 400 may control voltage between a first electrode part 230 and a second electrode part 270 such that the first optical path change surface 222R may have two surfaces R1 and R2 inclined at different angles.

If white light $L_W$ having a second polarization state ⊙ is incident on the beam deflector 508, the white light $L_W$ is split by a first wavelength selective polarizer 101 into red light $L_R$ having a first polarization state ↔, green light $L_G$ having the second polarization state ⊙, and blue light $L_B$ having the second polarization state ⊙. Then, the red light $L_R$ having a first polarization state ↔, the green light $L_G$ having the second polarization state ⊙, and blue light $L_B$ having the second polarization state ⊙ are incident on a first liquid crystal deflector 207. The first optical path change surface 222R of the first liquid crystal deflector 207 has an effect only on the first polarization state ↔. Thus, only the red light $L_R$ having the first polarization state ↔ is deflected, and the green light $L_G$ and the blue light $L_B$ having the second polarization state ⊙ are not deflected. In addition, since the first optical path change surface 222R includes the two surfaces R1 and R2 inclined at different angles, the red light $L_R$ having the first polarization state ↔ is refracted by the surfaces R1 and R2 in different directions. That is, the red light $L_R$ is split into light $L_{R\_1}$ propagating in a first direction A1 and light $L_{R\_2}$ propagating in a second direction A2. That is, the red light $L_R$ deflected in two directions by a time-sequence method under the control of the controller 400, or may be simultaneously deflected in two directions toward the left and right eyes of a user.

Figure 14:
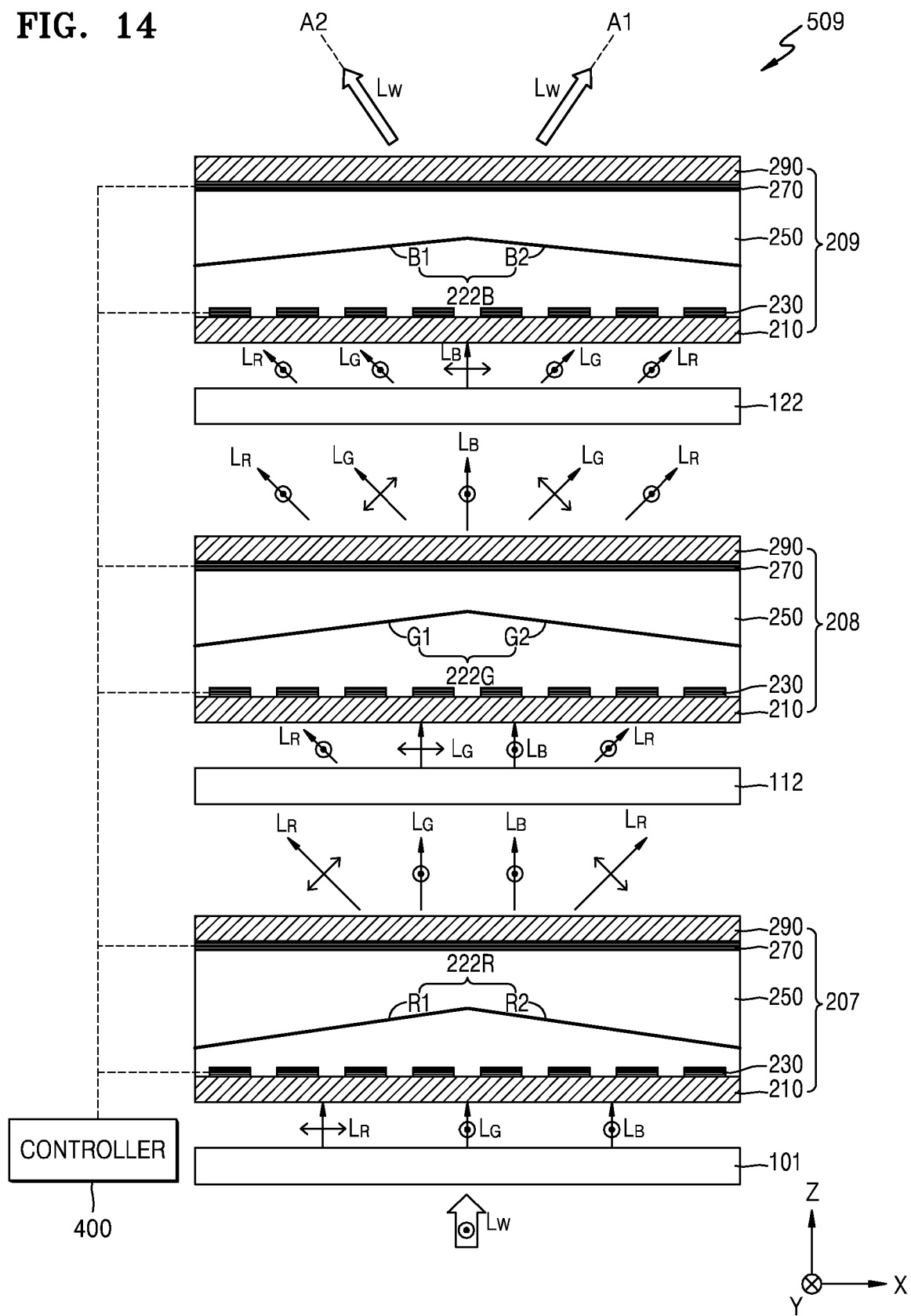
FIG. 14 is a cross-sectional view illustrating a beam deflector according to an example embodiment.

FIG. 14 is a cross-sectional view illustrating a beam deflector 509 according to an example embodiment.

The beam deflector 509 includes a first wavelength selective polarizer 101, a first liquid crystal deflector 207, a second wavelength selective polarizer 112, a second liquid crystal deflector 208, a third wavelength selective polarizer 122, and a third liquid crystal deflector 209 to sequentially deflect red light $L_R$, green light $L_G$, and blue light $L_B$.

The first to third liquid crystal deflectors 207, 208, and 209 respectively include first to third optical path change surfaces 222R, 222G, and 222B, and each of the first to third optical path change surfaces 222R, 222G, and 222B includes two surfaces inclined at different angles, which is different from the beam deflector 504 illustrated in FIG. 9. A controller 400 controls the shape of the first optical path change surface 222R such that the first optical path change surface 222R may have two surfaces R1 and R2 inclined at different angles to deflect and split red light $L_R$ incident on the first liquid crystal deflector 207 in two directions. In addition, the controller 400 controls the shape of the second optical path change surface 222G such that the second optical path change surface 222G may have two surfaces G1 and G2 inclined at different angles to deflect and split green light $L_G$ incident on the second liquid crystal deflector 208 in the two directions. In addition, the controller 400 controls the shape of the third optical path change surface 222B such that the third optical path change surface 222B may have two surfaces B1 and B2 inclined at different angles to deflect and split blue light $L_B$ on the third liquid crystal deflector 209 in the two directions.

In this manner, each of red light $L_R$, green light $L_G$, and blue light $L_B$ is deflected in a first direction A1 and a second direction A2. That is, white light $L_W$ is split in the first direction A1 and the second direction A2. The two directions may be toward the left and right eyes of a user when the beam deflector 509 is employed in a three-dimensional display device.

The beam deflector 509 of the example embodiment may further include a polarizer having a polarization axis in the direction of a second polarization state ⊙ such that light having only the second polarization state ⊙ may be incident on the first wavelength selective polarizer 101.

Figure 15:
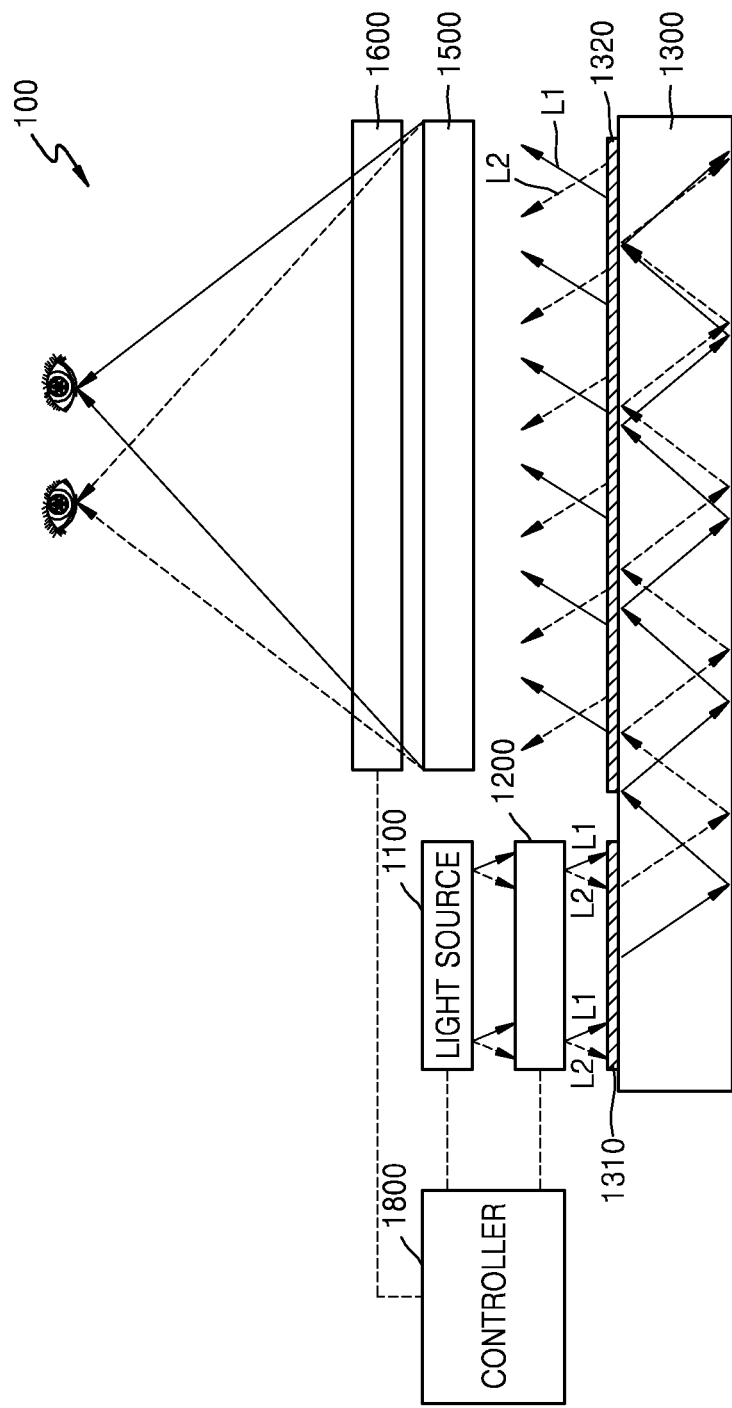
FIG. 15 is a cross-sectional view illustrating a three-dimensional display device according to an example embodiment.

FIG. 15 is a cross-sectional view illustrating a three-dimensional display device 1000 according to an example embodiment.

The three-dimensional display device 1000 includes a light source 1100 providing a coherent light beam in a plurality of wavelength bands, a beam deflector 1200 configured to deflect light emitted from the light source 1100, a controller 1800 configured to control the direction in which the beam deflector 1200 deflects light, and a spatial optical modulator 1600. In addition, the three-dimensional display device 1000 may further include a light guide member 1300 configured to guide light deflected by the beam deflector 1200 such that the light may propagate toward the spatial optical modulator 1600, and a field lens 1500 configured to focus a hologram image on a predetermined space.

The beam deflector 1200 may be one of the beam deflector 504 of FIG. 9, the beam deflector 505 of FIG. 10, the beam deflector 506 of FIG. 11, the beam deflector 509 of FIG. 14, a modification thereof, and a combination thereof.

The beam deflector 1200 may deflect light from the light source 1100 in two directions. L1 and L2 may become light propagating toward a left eye and light propagating toward a right eye, respectively. Incident light may be deflected in two directions by a time-sequence method under the control of the controller 400, or may be simultaneously deflected in two directions using the beam deflector 509 of FIG. 14, to provide light L1 and light L2.

After a light beam emitted from the light source 1100 is deflected by the beam deflector 1200, the light beam is guided and enlarged to a size corresponding to the spatial optical modulator 1600 by the light guide member 1300, and then the light beam is output toward the spatial optical modulator 1600. The light guide member 1300 may include an input coupler 1310 on which light deflected by the beam deflector 1200 is incident, and an output coupler 1320 through which the light is output after being guided along the light guide member 1300.

Two directional beams output through the light guide member 1300 are incident on the spatial optical modulator 1600 through the field lens 1500. The spatial optical modulator 1600 forms a hologram pattern having interference fringes for modulating incident light. Incident light may be diffracted and modulated by the hologram pattern formed by the spatial optical modulator 1600, and thus, a hologram image may be reproduced at a predetermined spatial position. A left-eye hologram image may be reproduced at a left-eye position, and a right-eye hologram image may be reproduced at a right-eye position.

Figure 16:
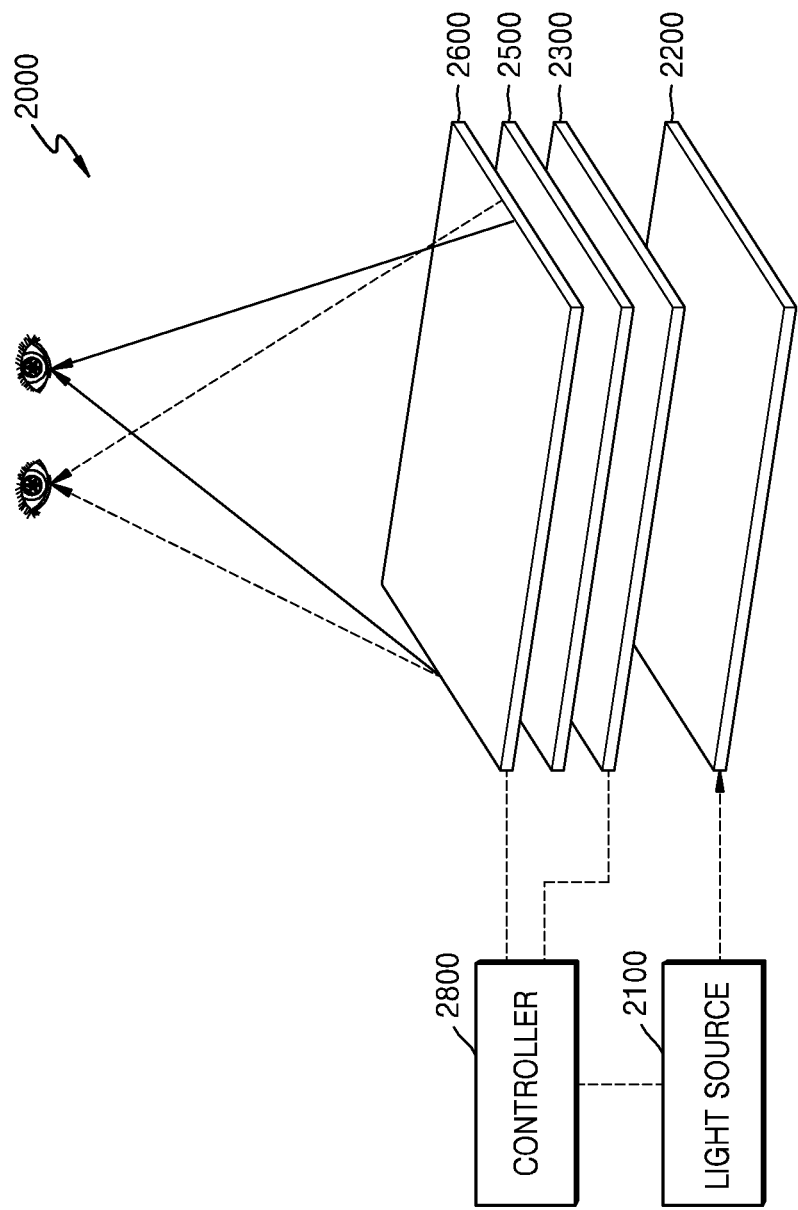
FIG. 16 is a perspective view illustrating a three-dimensional display device according to an example embodiment.

FIG. 16 is a perspective view illustrating a three-dimensional display device 2000 according to an example embodiment.

The three-dimensional display device 2000 includes a light source 2100 providing a coherent light beam in a plurality of wavelength bands, a beam deflector 2300 configured to deflect light emitted from the light source 2100, a controller 2800 configured to control the direction in which the beam deflector 2300 deflects light, and a spatial optical modulator 2600. In addition, the three-dimensional display device 2000 may further include a light guide member 2200 configured to guide light emitted from the light source 2100 such that the light may propagate toward the spatial optical modulator 2600, and a field lens 2500 configured to focus a hologram image on a predetermined space.

The beam deflector 2300 may be one of the beam deflector 504 of FIG. 9, the beam deflector 505 of FIG. 10, the beam deflector 506 of FIG. 11, the beam deflector 509 of FIG. 14, a modification thereof, and a combination thereof.

The three-dimensional display device 2000 of the example embodiment is different from the three-dimensional display device 1000 of FIG. 15 in the position of the beam deflector 2300.

A light beam emitted from the light source 2100 is enlarged to a size corresponding to the spatial optical modulator 2600 while being guided along the light guide member 2200, and is then incident on the beam deflector 2300. The beam deflector 2300 deflects incident light in a target direction. For example, the beam deflector 2300 may deflect incident light in a direction toward the left eye of a user and a direction toward the right eye of the user. Incident light may be deflected in two directions by a time-sequence method under the control of the controller 2800, or may be simultaneously deflected in two directions using the beam deflector 509 of FIG. 14, so as to provide such directional light.

Two directional beams output through the beam deflector 2300 are incident on the spatial optical modulator 2600 through the field lens 2500. The spatial optical modulator 2600 forms a hologram pattern having interference fringes for modulating incident light. Incident light may be diffracted and modulated by the hologram pattern formed by the spatial optical modulator 2600, and thus, a hologram image may be reproduced at a predetermined spatial position. A left-eye hologram image may be reproduced at a left-eye position, and a right-eye hologram image may be reproduced at a right-eye position.

Each of the three-dimensional display device 1000 of FIG. 15 and the three-dimensional display device 2000 of FIG. 16 may further include an eye tracking sensor to track the left and right eyes of a user, and thus, output deflected light beams toward the left and right eyes tracked.

As described above, the three-dimensional display devices 1000 and 2000 of FIGS. 15 and 16 include the beam deflectors 1200 and 2300 capable of deflecting incident light in target directions without scattering, and thus, may improve the quality of three-dimensional images.

According to example embodiments, beam deflectors may include a wavelength selective polarizer and a liquid crystal deflector such that light in a target wavelength band may be deflected in a target direction.

According to example embodiments, beam deflectors may deflect light in different wavelength bands in the same direction by using a more simple control structure.

According to example embodiments, beam deflectors may be employed in three-dimensional display devices to provide higher quality three-dimensional images.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A display device comprising:
   a polarizer that is configured to transmit light of a specific polarization state and absorb light of a polarization state that is different from the specific polarization state;
   a first wavelength selective polarizer configured to selectively convert a second polarization state of light in a first wavelength band among light transmitted by the polarizer into a first polarization state and maintain a second polarization state of light in a second wavelength band that is different from the first wavelength band, the light transmitted by the polarizer being directly incident on the first wavelength selective polarizer; and
   a first liquid crystal deflector configured to selectively deflect light of the first polarization state incident from the first wavelength selective polarizer, the first liquid crystal deflector comprising liquid crystal molecules, and a first electrode part and a second electrode part spaced apart from each other with the liquid crystal molecules therebetween.

2. The display device of claim 1, wherein major axes of the liquid crystal molecules are arranged parallel to a direction of the first polarization state when a voltage is not applied to the first liquid crystal deflector.

3. The display device of claim 1, wherein the first liquid crystal deflector further comprises a first optical path change surface, and
   wherein an angle of inclination of the first optical path change surface is adjusted based on a voltage applied between the first electrode part and the second electrode part.

4. The display device of claim 3, wherein the first electrode part comprises sub-electrodes configured such that voltages applied to the sub-electrodes are individually controlled.

5. The display device of claim 3, further comprising a first-second liquid crystal deflector provided above the first liquid crystal deflector opposite to the first wavelength selective polarizer, the first-second liquid crystal deflector comprising liquid crystal molecules and a first-second optical path change surface,
   wherein the angle of inclination of the first-second optical path change surface is adjusted with respect to a second axis which is different from a first axis of the first optical path change surface.

6. The display device of claim 3, wherein a shape of the first optical path change surface is controlled such that the first optical path change surface comprises two surfaces inclined at different angles to deflect light incident on the first liquid crystal deflector in two directions, respectively, the two surfaces both deflecting light of the first wavelength band.

7. The display device of claim 3, further comprising:
   a second wavelength selective polarizer provided along an optical path of light passing through the first liquid crystal deflector and configured to convert the second polarization state of light in the second wavelength band into the first polarization state; and
   a second liquid crystal deflector configured to deflect light incident from the second wavelength selective polarizer, the second liquid crystal deflector comprising liquid crystal molecules and a second optical path change surface.

8. The display device of claim 7, further comprising:
   a third wavelength selective polarizer provided along an optical path of light passing through the second liquid crystal deflector and configured to convert a polarization state of light in a third wavelength band into the first polarization state; and
   a third liquid crystal deflector configured to deflect light incident from the third wavelength selective polarizer, the third liquid crystal deflector comprising liquid crystal molecules and a third optical path change surface.

9. The display device of claim 8, wherein the first liquid crystal deflector, the second liquid crystal deflector, and the third liquid crystal deflector are controlled such that the first optical path change surface, the second optical path change surface, and the third optical path change surface are adjusted to be inclined at different angles to deflect light in the first wavelength band and the first polarization state, light in the second wavelength band and the first polarization state, and light in the third wavelength band and the first polarization state in a first direction, respectively.

10. The display device of claim 9, further comprising an optical path change member configured to deflect the light deflected in the first direction by the first liquid crystal deflector, the second liquid crystal deflector, and the third liquid crystal deflector in a second direction different from the first direction.

11. The display device of claim 8, wherein a shape of the first optical path change surface is controlled such that the first optical path change surface comprises two surfaces inclined at different angles to deflect light incident on the first liquid crystal deflector in two directions, respectively,
wherein a shape of the second optical path change surface is controlled such that the second optical path change surface has two surfaces inclined at different angles to deflect light incident on the second liquid crystal deflector in the two directions, respectively, and
wherein a shape of the third optical path change surface is controlled such that the third optical path change surface has two surfaces inclined at different angles to deflect light incident on the third liquid crystal deflector in the two directions, respectively.

12. The display device of claim 11, further comprising an optical path change member configured to deflect the light deflected in the two directions by the first liquid crystal deflector, the second liquid crystal deflector, and the third liquid crystal deflector in directions different from the two directions.

13. The display device of claim 8, further comprising:
a light source configured to emit a light beam comprising a plurality of wavelength bands; and
a spatial optical modulator configured to modulate light incident through the first liquid crystal deflector, the second liquid crystal deflector, and the third liquid crystal deflector.

14. The display device of claim 13, wherein major axes of the liquid crystal molecules included in the first liquid crystal deflector, the second liquid crystal deflector, and the third liquid crystal deflector are arranged parallel to a direction of the first polarization state when a voltage is not applied to the first liquid crystal deflector, the second liquid crystal deflector, and the third liquid crystal deflector.

15. The display device of claim 13, further comprising:
a first-second liquid crystal deflector provided above the first liquid crystal deflector, the first-second liquid crystal deflector comprising liquid crystal molecules and a first-second optical path change surface, wherein an angle of inclination of the first-second optical path change surface is adjusted with respect to a first-second axis which is different from a first axis of the first optical path change surface;
a second-second liquid crystal deflector provided above the second liquid crystal deflector, the second-second liquid crystal deflector comprising liquid crystal molecules and a second-second optical path change surface, wherein an angle of inclination of the second-second optical path change surface is adjusted with respect to a second-second axis which is different from a second axis of the second optical path change surface; and
a third-second liquid crystal deflector provided above the third liquid crystal deflector, the third-second liquid crystal deflector comprising liquid crystal molecules and a third-second optical path change surface, wherein an angle of inclination of the third-second optical path change surface is adjusted with respect to a third-second axis which is different from a third axis of the third optical path change surface.

16. The display device of claim 13, wherein a shape of the first optical path change surface is controlled such that the first optical path change surface comprises two surfaces inclined at different angles to deflect light incident on the first liquid crystal deflector in two directions, respectively,
wherein a shape of the second optical path change surface is controlled such that the second optical path change surface has two surfaces inclined at different angles to deflect light incident on the second liquid crystal deflector in the two directions, respectively, and
wherein a shape of the third optical path change surface is controlled such that the third optical path change surface has two surfaces inclined at different angles to deflect light incident on the third liquid crystal deflector in the two directions, respectively.

17. The display device of claim 8, wherein the first liquid crystal deflector, the second liquid crystal deflector, and the third liquid crystal deflector are controlled such that the first optical path change surface, the second optical path change surface, and the third optical path change surface are adjusted to be inclined at different angles to deflect light in the first wavelength band and the first polarization state, light in the second wavelength band and the first polarization state, and light in the third wavelength band and the first polarization state in a first direction, respectively.

18. The display device of claim 17, wherein the first direction in which light is deflected is adjusted, by a time-sequence method, between a direction toward a left eye of a user and a direction toward a right eye of the user.

19. The display device of claim 18, further comprising an eye tracking sensor to track a position of the left eye and the right eye of the user.

* * * * *